US011907125B2

(12) United States Patent
Alexander et al.

(10) Patent No.: US 11,907,125 B2
(45) Date of Patent: Feb. 20, 2024

(54) HOT LINE FAIRNESS MECHANISM FAVORING SOFTWARE FORWARD PROGRESS

(71) Applicant: INTERNATIONAL BUSINESS MACHINES CORPORATION, Armonk, NY (US)

(72) Inventors: Gregory William Alexander, Pflugerville, TX (US); Tu-An T. Nguyen, Austin, TX (US); Deanna Postles Dunn Berger, Hyde Park, NY (US); Timothy Bronson, Round Rock, TX (US); Christian Jacobi, West Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/713,263

(22) Filed: Apr. 5, 2022

(65) Prior Publication Data
US 2023/0315637 A1    Oct. 5, 2023

(51) Int. Cl.
*G06F 12/084* (2016.01)
*G06F 7/58* (2006.01)
*G06F 9/30* (2018.01)
*G06F 12/0831* (2016.01)

(52) U.S. Cl.
CPC ............ *G06F 12/084* (2013.01); *G06F 7/584* (2013.01); *G06F 9/30134* (2013.01); *G06F 12/0833* (2013.01)

(58) Field of Classification Search
CPC ............... G06F 12/0833; G06F 12/084; G06F 9/30134; G06F 7/584
See application file for complete search history.

(56) References Cited

U.S. PATENT DOCUMENTS

| 6,138,218 A * | 10/2000 | Arimilli .............. G06F 12/0833 711/146 |
| 7,340,565 B2 | 3/2008 | Steely, Jr. et al. |
| 8,677,014 B2 | 3/2014 | Cometto et al. |
| 9,513,959 B2 | 12/2016 | Biles et al. |
| 10,310,982 B2 | 6/2019 | Berger et al. |
| 10,339,064 B2 | 7/2019 | Blake et al. |
| 10,489,294 B2 | 11/2019 | Blake et al. |
| 10,671,532 B2 | 6/2020 | Zoellin et al. |
| 10,705,977 B2 | 7/2020 | Barczak et al. |

(Continued)

OTHER PUBLICATIONS

Anonymous—"Method and Apparatus for Dynamic Cache Bypass and Insertion"; IPCOM000223644D; ip.com Nov. 20, 2012; 7p.

(Continued)

*Primary Examiner* — Aracelis Ruiz
(74) *Attorney, Agent, or Firm* — Edward Wixted; Cantor Colburn LLP

(57) ABSTRACT

A computer-implemented method is provided. The method includes determining whether a rejection of a request is required and determining whether the request is software forward progress (SFP)-likely or SFP-unlikely upon determining that the rejection of the request is required. The method also includes executing a first pseudo random decision to set or not set a requested state of the request in an event the request is SFP-likely or SFP-unlikely, respectively, and rejecting the request following execution of the second pseudo random decision.

20 Claims, 15 Drawing Sheets

(56) References Cited

U.S. PATENT DOCUMENTS

| | | | |
|---|---|---|---|
| 11,010,210 | B2 | 5/2021 | Sonnelitter et al. |
| 2006/0230233 | A1 | 10/2006 | Steely et al. |
| 2013/0311999 | A1* | 11/2013 | Fetterman ............. G06F 9/5011 718/104 |
| 2015/0378919 | A1 | 12/2015 | Anantaraman et al. |
| 2018/0157589 | A1 | 6/2018 | Jayasena et al. |
| 2018/0285277 | A1 | 10/2018 | Blake et al. |
| 2018/0293172 | A1 | 10/2018 | Blake et al. |
| 2018/0314447 | A1 | 11/2018 | Driever et al. |

OTHER PUBLICATIONS

Anonymous, "Distributed Software Controlled Cache"; IPCOM000188596D, ip.com; Oct. 15, 2009, 4p.

Anonymous, "Fairness circuit for automic read-modify-write operations on multiprocessor systems", ip.com, IPCOM000256121D; Nov. 6, 2018, 5p.

Anonymous, "Improving CPU Cache Performance"; ip.com, IPCOM000192659D; Jan. 27, 2010, 3p.

Anonymous, "Method and Apparatus for Cooperative State Prefetching in Clustered Shared Memory Multiprocessor Systems with Region Coherence Arrays"; ip.com IPCOM000180817D; Mar. 17, 2009; 7 pages.

Anonymous, "Method and Apparatus for Coordinating a Single Active and Multiple Hot-Standby Systems in an Automated FailOver Configuration", IPCOM000245147D, IP.com; Feb. 14, 2016; 7p.

Anonymous, "Method for Prefetching Cache Lines Based on the Presence of Uninitialized Lines", IPCOM000027339D, IP.com; Apr. 7, 2004, 3p.

Anonymous; "Method for Decentralized Lock Management of Shared Resources Across Distributed Priority Nodes"; IPCOM000264621D; Jan. 12, 2021; 5p.

Anonymous; "Method to Handle Speculative Load Requests in a Cache Environment"; IPCOM000188235D; ip.com; Sep. 28, 2009; 2p.

Anonymously, "Machine-Learned Caching of Datasets"; IPCOM000252027D; ip.com; Dec. 14, 2017; 38 pgs.

Dessouki, "JACS—Just Another Communications Stack", IPCOM000262014D; ip.com, Apr. 24, 2020, 35 p.

Lipasti, "Cache Replacement Policies"; ECE/CS 752 Spring 2016, 25 p.

List of IBM Patents or Patent Applications Treated as Related; Date Filed: April, 5, 2022, 2 pages.

Nguyen "Preemptive Tracking of Remote Requests for Decentralized Hot Cache Line Fairness Tracking" U.S. Appl. No. 17/713,267, filed Apr. 5, 2022.

Nguyen, "Decentralized Hot Cache Line Tracking Fairness Mechanism", U.S. Appl. No. 17/713,264, filed Apr. 5, 2022.

Novakovic, "Storm: a fast transactional dataplane for remote data structures"; ResearchGate; Feb. 2019; 16p.

Rudolph; "Dynamic Decentralized Cache Schemes for MIMD Parallel Processors"; ACM SIGARCH Computer Architecture News; Jun. 1984; 28 p.

Zakhary, "Cache on Track (CoT): Decentralized Elastic Caches for Cloud Environments"; Series ISSN: 2367-2005; Proceedings of the 24th International Conference on Extending Database Technology; Mar. 20, 2021; 12p.

International Search Report and Written Opinion for International Application No. PCT/EP2023/058121; International Filing Date: Mar. 29, 2023; dated Jun. 22, 2023; 11 pages.

International Search Report and Written Opinion; dated Jul. 6, 2023; Application No. PCT/EP2023/057385; Filed: Mar. 22, 2023; 14 pages.

\* cited by examiner

HOT LINE FAIRNESS VECTORS (REQUESTED VECTOR, SERVICED VECTOR)
CHIP SCOPE (LOWEST SCOPE)

(REQUESTED VECTOR, SERVICED VECTOR)
DRAWER SCOPE (NEXT HIGHEST SCOPE)

(REQUESTED VECTOR, SERVICED VECTOR)
SYSTEM SCOPE (HIGHEST SCOPE)

FIG. 6

601 – L30 HAS THE CACHE LINE.

| L30 LFAR STATE | REQUESTED VECTOR | | SERVICED VECTOR | |
|---|---|---|---|---|
| | CHIP | DRAWER | CHIP | DRAWER |
| WORKING ON CACHE LINE | 0000 | 00 | 1000 | 10 |

602 – L32 REQUESTS THE CACHE LINE. L30 RECORDS THE REQUEST FROM L32 AND REJECTS L32 TO COME BACK LATER.

| L30 LFAR STATE | REQUESTED VECTOR | | SERVICED VECTOR | |
|---|---|---|---|---|
| | CHIP | DRAWER | CHIP | DRAWER |
| WORKING ON CACHE LINE | 0010 | 00 | 1000 | 10 |

603 – L33 REQUESTS THE CACHE LINE. L30 RECORDS THE REQUEST FROM L33 AND REJECTS L33 TO COME BACK LATER.

| L30 LFAR STATE | REQUESTED VECTOR | | SERVICED VECTOR | |
|---|---|---|---|---|
| | CHIP | DRAWER | CHIP | DRAWER |
| WORKING ON CACHE LINE | 0011 | 00 | 1000 | 10 |

604 AND 605 – L32 REQUESTS THE CACHE LINE. L30 PASSES THE CACHE LINE TO L32.

| L32 LFAR STATE | REQUESTED VECTOR | | SERVICED VECTOR | |
|---|---|---|---|---|
| | CHIP | DRAWER | CHIP | DRAWER |
| WORKING ON CACHE LINE | 0001 | 00 | 1010 | 10 |

FIG. 7A

701 - L30 ON CHIP 0 HAS THE CACHE LINE.

| L30 LFAR STATE | REQUESTED VECTOR | | SERVICED VECTOR | |
|---|---|---|---|---|
| | CHIP | DRAWER | CHIP | DRAWER |
| WORKING ON CACHE LINE | 0000 | 00 | 1000 | 10 |

702 - L33 ON CHIP 0 REQUESTS THE CACHE LINE. L30 RECORDS THE REQUEST FROM L33 AND REJECTS L33 TO COME BACK LATER.

| L30 LFAR STATE | REQUESTED VECTOR | | SERVICED VECTOR | |
|---|---|---|---|---|
| | CHIP | DRAWER | CHIP | DRAWER |
| WORKING ON CACHE LINE | 0001 | 00 | 1000 | 10 |

703 – CHIP1 REQUESTS THE CACHE LINE. L30 RECORDS THE REQUEST FROM CHIP1 AND REJECTS CHIP1 TO COME BACK LATER BECAUSE A CHIP SCOPE REQUESTED BIT IS SET.

| L30 LFAR STATE | REQUESTED VECTOR | | SERVICED VECTOR | |
|---|---|---|---|---|
| | CHIP | DRAWER | CHIP | DRAWER |
| WORKING ON CACHE LINE | 0001 | 01 | 1000 | 10 |

FIG. 7B

704 & 705 – L33 REQUESTS THE CACHE LINE. L30 PASSES THE CACHE LINE TO L33.

| L33 LFAR STATE | REQUESTED VECTOR | | SERVICED VECTOR | |
|---|---|---|---|---|
| | CHIP | DRAWER | CHIP | DRAWER |
| WORKING ON CACHE LINE | 0000 | 01 | 1001 | 10 |

706 & 707 – CHIP1 REQUESTS THE CACHE LINE. L33 PASSES THE CACHE LINE TO CHIP1 WITH ZERO CHIP SCOPE VECTORS.
-- CHIP1 INSTALLS THE LINE IN L32 ON CHIP1.

| CHIP1 L32 LFAR STATE | REQUESTED VECTOR | | SERVICED VECTOR | |
|---|---|---|---|---|
| | CHIP | DRAWER | CHIP | DRAWER |
| WORKING ON CACHE LINE | 0000 | 00 | 0010 | 11 |

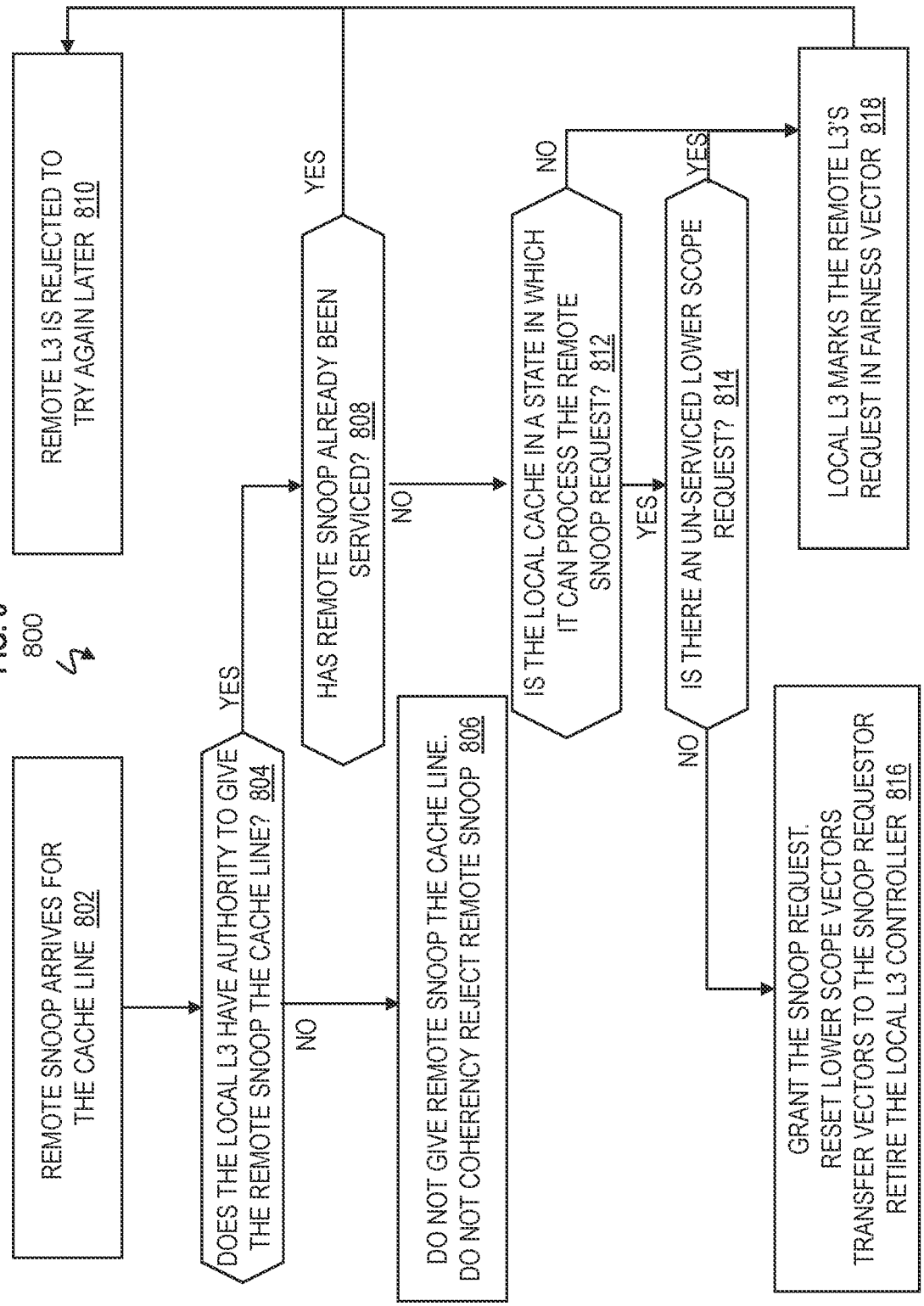

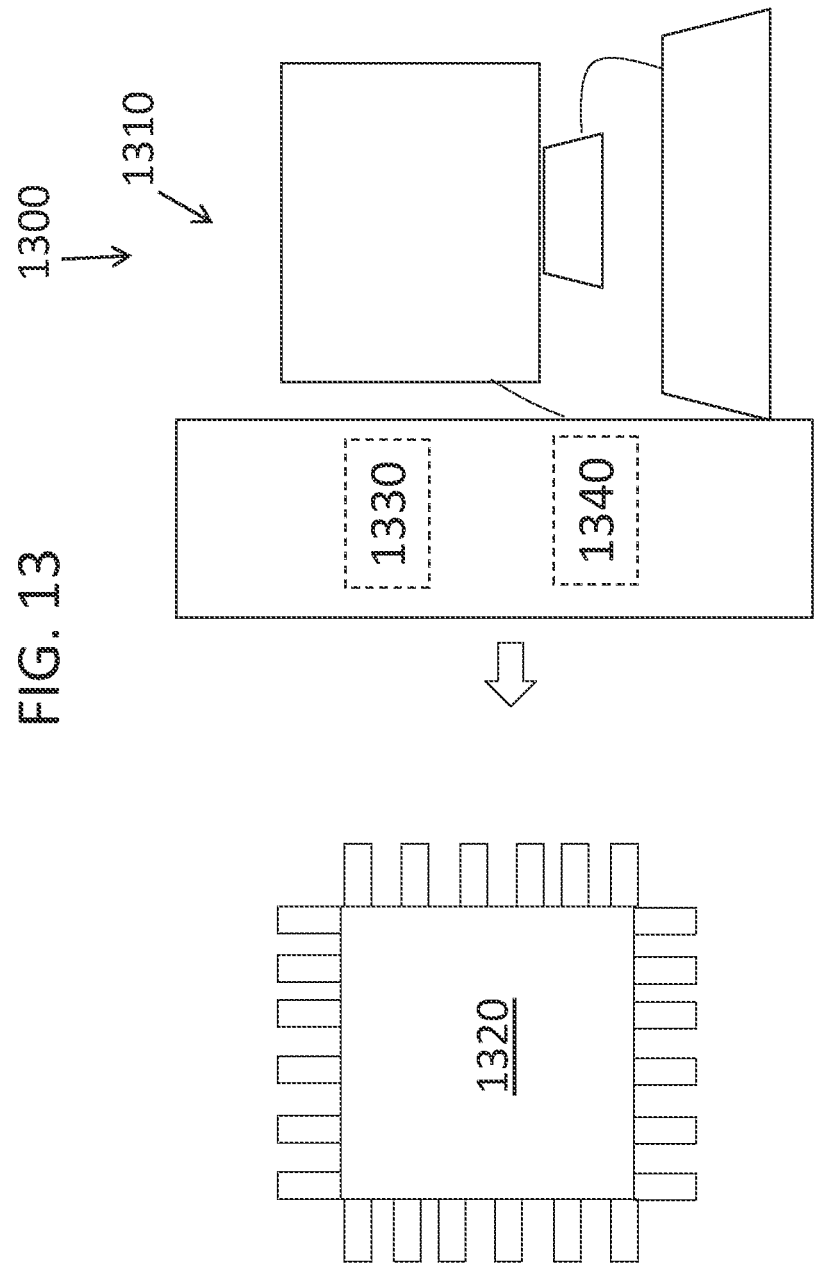

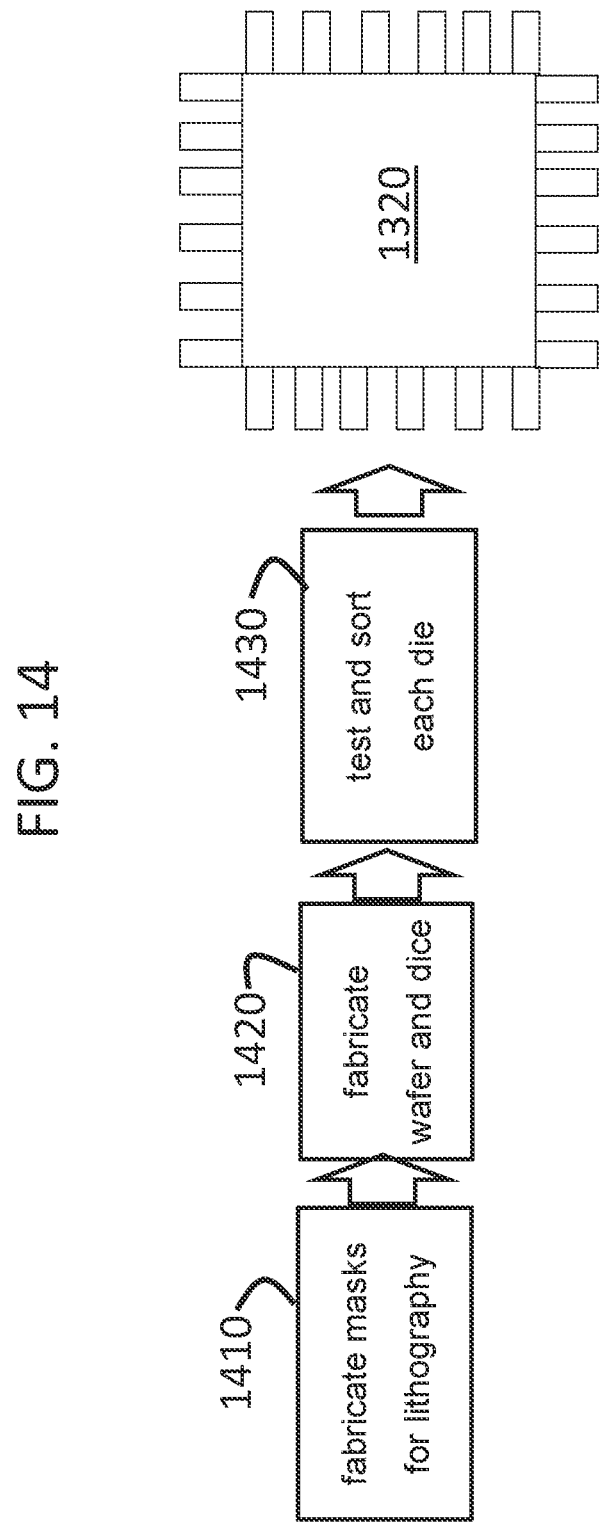

HOT LINE FAIRNESS MECHANISM FAVORING SOFTWARE FORWARD PROGRESS

BACKGROUND

The present invention generally relates to computer systems, and more specifically, to computer-implemented methods, computer systems, and computer program products configured and arranged for providing a hot line fairness mechanism favoring software forward progress.

In computing environments that have multiple processor chips on the same drawers and/or processor chips in other drawers sharing one or more caches, those processor chips may have access to the same cache lines. A cache line or line is a portion of data of a specific size (e.g., 256 bytes), which fits into a single cache entry in a cache. Coherency is managed on a cache line granularity as data is transferred between memory and a cache. To ensure coherency of a cache line, snoop requests (also referred as snoops or fetch requests) are used. Snoop requests are processed by receiving a snoop request from a requesting cache, determining if this cache has a copy of the cache line in an appropriate state, sending the cache line and associated metadata to the requesting cache, and updating the state of the cache line in this cache.

A cache structure and its related services provide processor chips with data consistency of their shared data. Many processor chips on the same drawer and/or processor chips on different drawers may attempt to access the same cache line. Techniques are needed to improve access to a cache line of a shared cache.

SUMMARY

Embodiments of the present invention are directed to computer-implemented methods. A non-limiting computer-implemented method includes determining whether a rejection of a request is required and determining whether the request is software forward progress (SFP)-likely or SFP-unlikely upon determining that the rejection of the request is required. The method also includes executing a first pseudo random decision to set or not set a requested state of the request in an event the request is SFP-likely or SFP-unlikely, respectively, and rejecting the request following execution of the second pseudo random decision.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram illustrating an example of vector maintenance and passing for decentralized hot cache line tracking fairness according to one or more embodiments of the present invention;

FIGS. 7A and 7B depict a block diagram illustrating an example of vector maintenance and passing for decentralized hot cache line tracking fairness according to one or more embodiments of the present invention;

FIG. 8 is a flowchart of a computer-implemented process for a decentralized hot cache line tracking fairness mechanism for accessing a cache line in a shared cache according to one or more embodiments of the present invention;

FIG. 13 is a block diagram of a system to design/layout of an integrated circuit (IC) using a decentralized hot cache line tracking fairness mechanism in an IC in accordance with one or more embodiments of the present invention; and FIG. 14 is a process flow of a method of fabricating the IC of FIG. 13 in accordance with one or more embodiments of the present invention.

DETAILED DESCRIPTION

Figure 1:
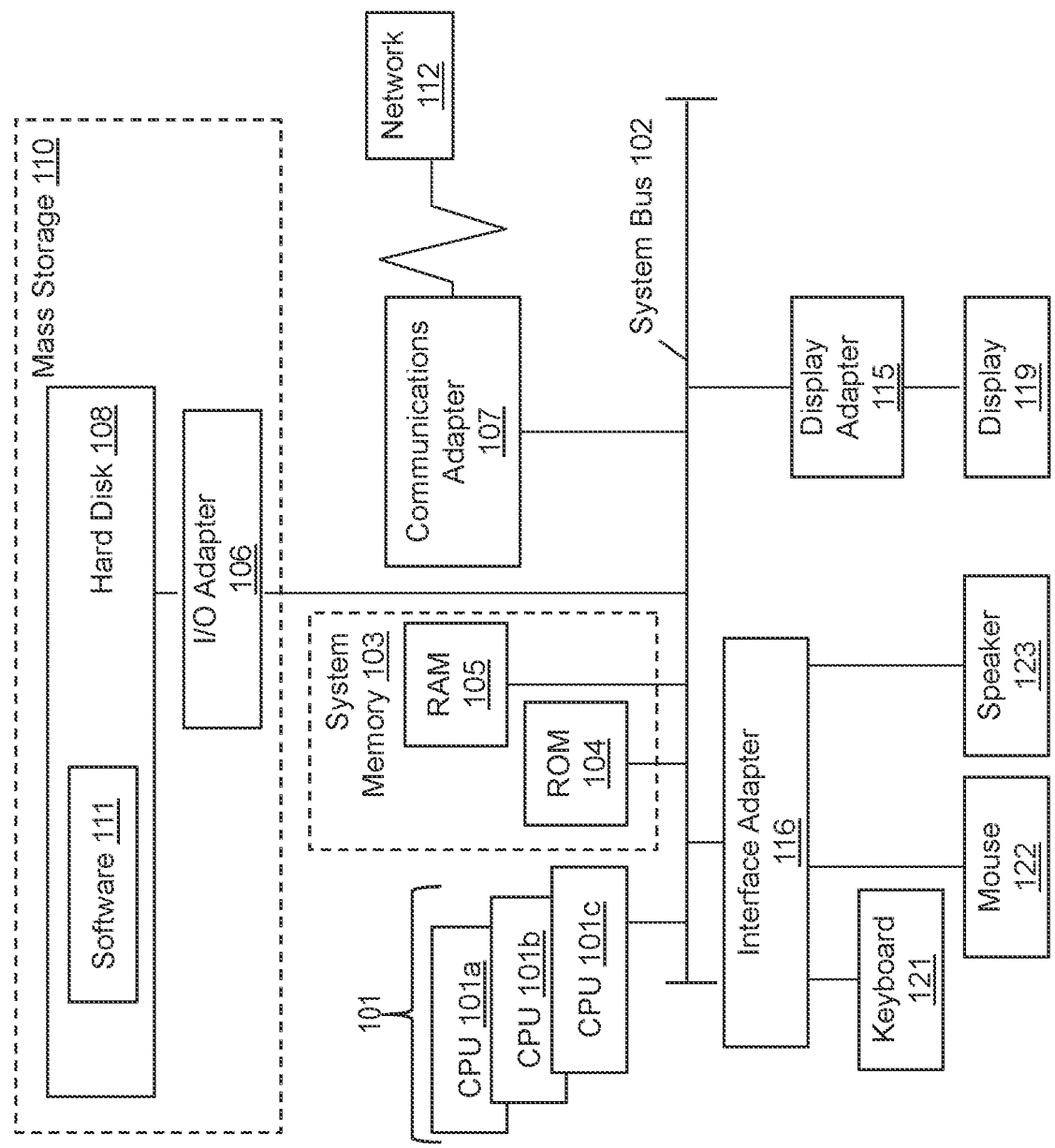
FIG. 1 depicts a block diagram of an example computer system for use in conjunction with one or more embodiments of the present invention.

A hot line fairness mechanism that favors software forward progress (SFP) requests is provided. Each request or fetch arrives and includes an indication if the request is SFP-likely or SFP-unlikely. This indication can be a hardware heuristic or a software-controlled hint. If the request is required to be rejected and is SFP-likely, a requested state of the request will be set. If the request is required to be rejected and is SFP-unlikely, the request is rejected following execution of a first pseudo random decision to set or not set the requested state. If the request does not need to be rejected and is SFP-likely, the request is processed. If the request does not need to be rejected and is SFP-unlikely, a second pseudo random decision is executed as to whether to process the request or not. The request is processed if a result of the second pseudo random decision is positive. If the result of the second pseudo random decision is negative, the request is rejected following execution of third pseudo random decision to set or not set the requested state of the request. For each request that arrives with a requested state set, a determination is made as to whether the request is required to be rejected. If so, the requested state is maintained and the request is rejected. If not, the request is processed.

Hot line tracking is often used to track contention for a lock line. However, some fetches, like a fetch for a lock release, are very likely to be SFP-likely and need to occur quickly. Other fetches, like a fetch to check if a lock is still held, are SFP-unlikely. If too much time is spent servicing SFP-unlikely lines at the expense of SFP-likely lines, overall performance is degraded. Thus, there is often need for a mechanism to favor SFP-likely lines in an overall hot line fairness mechanism. Therefore, in some hot line fairness mechanisms, a "previously requested" state is maintained for each requestor. If any request is rejected from a requestor that has not been serviced, the "previously requested" state is set for that requestor. Similarly, if a request arrives for a requestor that has not been serviced, the request is serviced rather than rejected.

Accordingly, one or more embodiments of the invention provide a method for operating a hot line fairness mechanism favoring software forward progress including determining whether a rejection of a request is required and determining whether the request is software forward progress (SFP)-likely or SFP-unlikely upon determining that the rejection of the request is required. The method also includes executing a first pseudo random decision to set or not set a requested state of the request in an event the request is SFP-likely or SFP-unlikely, respectively, and rejecting the request following execution of the second pseudo random decision.

Thus, by selectively rejecting and not always reserving a chance for SFP-unlikely requests to occupy hot lines, the SFP-unlikely requests are less likely to interfere with SFP-likely requests. For a lock release case, the method saw a 60% reduction in cycles per lock on some lock contention workloads. At the same time, since SFP-unlikely requests are included in the hot line tracking a portion of the time, they are not starved long-term from a hardware forward progress perspective.

For the sake of brevity, conventional techniques related to semiconductor device and IC fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
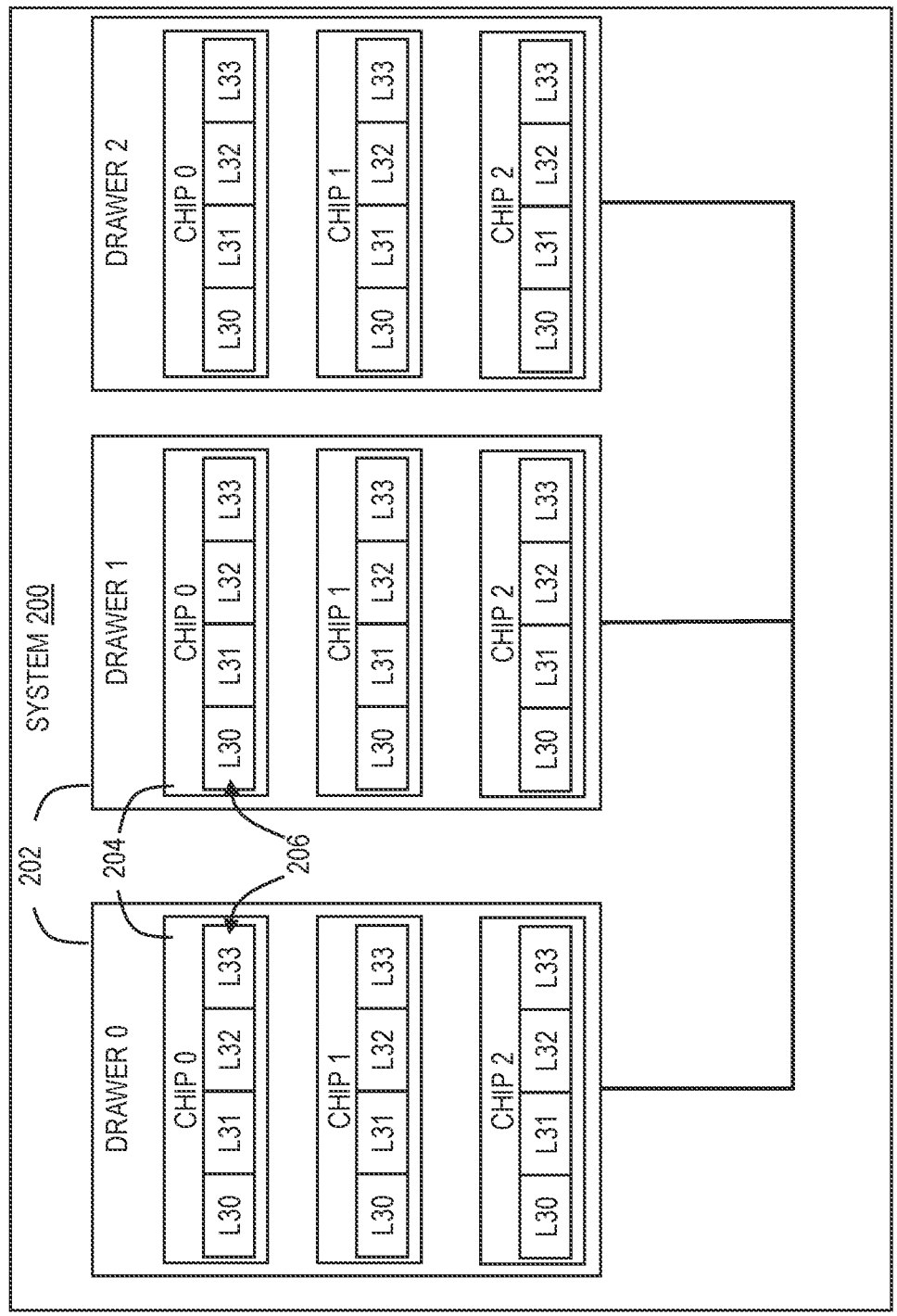
FIG. 2 depicts a block diagram of an example system configured to provide a decentralized hot cache line tracking fairness mechanism according to one or more embodiments of the present invention.
Figure 3:
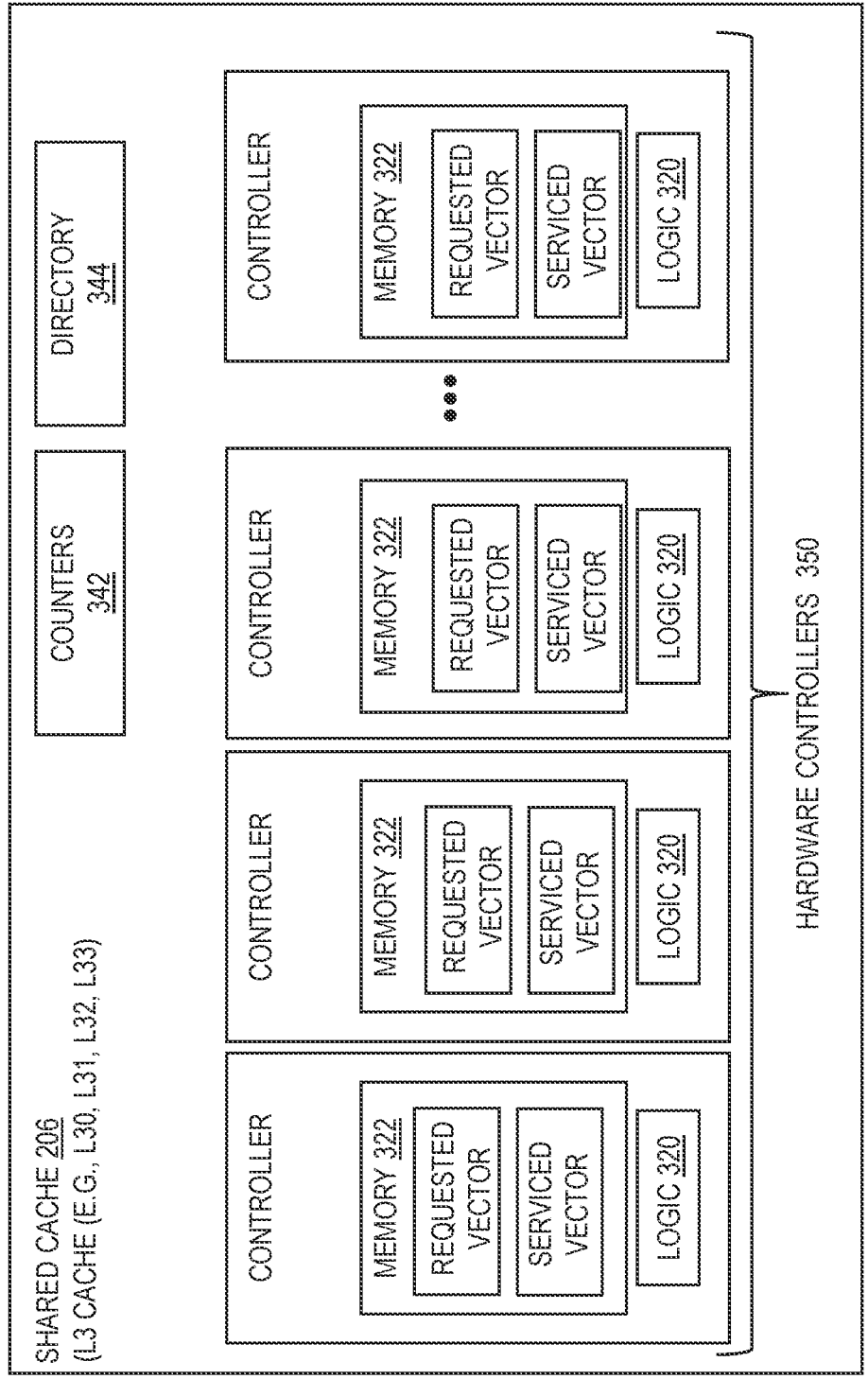
FIG. 3 depicts a block diagram of an example shared cache configured to provide a decentralized hot cache line tracking fairness mechanism according to one or more embodiments of the present invention.

FIG. 2 depicts a block diagram of an example system 200 configured to provide a decentralized hot cache line tracking fairness mechanism according to one or more embodiments of the invention. In system 200, there can be many interconnected drawers 202, such as drawer 0, drawer 1, and drawer 2. Each of the drawers 202 includes processor chips 204, such as processor chip 0, processor chip 1, and processor chip 2. Each processor chip 204 is coupled to and/or includes shared caches 206 (e.g., level three (L3) caches), such as L30, L31, L32, and L33. Further details of an example shared cache 206 is depicted in FIG. 3. Computer system 100 may be integrated with and/or use processor chips 204 in FIG. 2. Many computer systems 100 and/or features of computer systems 100 may be integrated in system 200. The system 200 may be representative of one or more portions of a cloud computing environment 50 depicted in FIG. 11. One or more processors 101 may represent processor chips 204. The processor chips 204 include all the standard processing circuitry and shared caches 206 include the standard memory and circuity as understood by one of ordinary skill in the art. Although not shown for conciseness, the processor chips can include higher-level caches, such as L2 caches and L1 caches, where the L1 cache is closest to the processor core as understood by one of ordinary skill in the art.

FIG. 3 depicts a block diagram of an example shared cache 206 (e.g., L30, L31, L32, L33) configured to provide a decentralized hot cache line tracking fairness mechanism according to one or more embodiments of the invention. Although details of a single shared cache 206 are illustrated in FIG. 3, the discussion applies by analogy to the other shared caches 206. Shared cache 206 can include and/or be coupled to various hardware controllers 350 in which the hardware controllers 350 are configured to control access to cache lines on the shared cache 206 such as for reading or writing, to send requests to access other cache lines on other shared caches 206, and to implement a requested vector and serviced vector per cache line according to one or more embodiments. Particularly, each hardware controller 350 includes logic 320 configured to provide decentralized hot cache line tracking fairness using a requested vector and serviced vector. A hardware controller 350 may include the requested vector and serviced vector for a single cache line in memory 322, and the requested vector and serviced vector for the cache line are passed along as metadata to the next hardware controller 350 along with the data in the cache line. As such, each cache line in a shared cache 206 has its own requested vector and serviced vector which are maintained and passed throughout the system 200 according to one or more embodiments.

Hardware controllers 350 can include the functionality of one or more known hardware controllers. Hardware controllers 350 can be and/or include functionality of local fetch address register controllers (LFARs), control store address register controllers (CSARs), central processor fetch controllers (CFARs), remote fetch controllers (RFARs), line local store address register controllers (L-LSARs), remote local store address register controllers (R-LSARs), remote store address controller (RSAR), and other hardware controllers understood by one of ordinary skill in the art. Logic 320 can include logic circuitry, firmware executable by circuits on hardware controller 350, and/or a combination of logic circuitry and firmware. Moreover, logic 320 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, logic 320 described herein can be a combination of hardware and programming. The programming can be processor executable instructions stored on a tangible memory, and the hardware can include processing circuitry for executing those instructions. Alternatively or additionally, logic 320 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Logic 320 of hardware controllers 350 of the shared caches are configured to provide a decentralized hierarchical hot line fairness tracking mechanism. This mechanism is comparable to centralized fairness tracking in terms of performance, and it scales. The decentralized mechanism grows organically and does not need additional space for each address. As noted herein, the decentralized hierarchical fairness tracking mechanism uses a requested vector and a serviced vector, which are allocated, deallocated, and associated with a single cache line.

Figure 4:
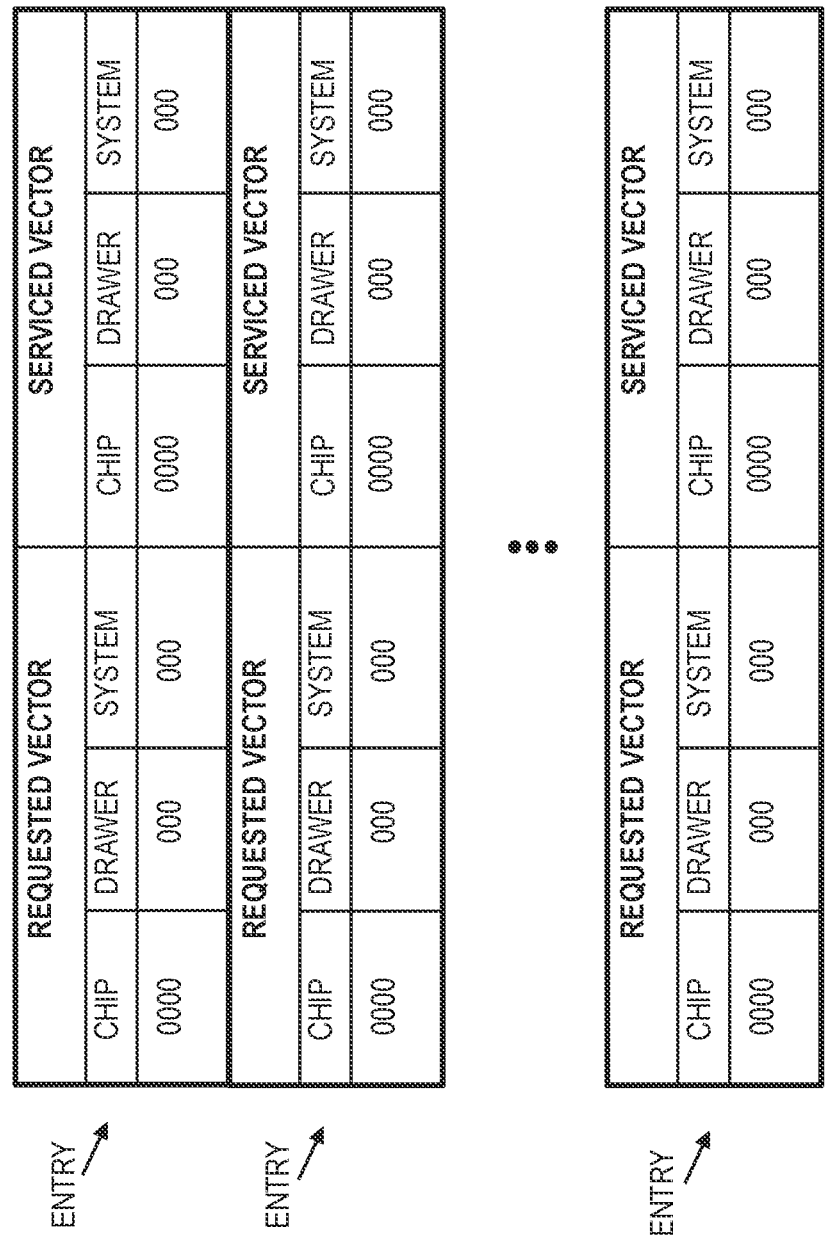
FIG. 4 depicts a block diagram illustrating an example requested vector and an example serviced vector for each cache line in decentralized hierarchical hot line fairness tracking according to one or more embodiments of the present invention.

FIG. 4 depicts a block diagram illustrating an example requested vector and an example serviced vector used for each cache line in decentralized hierarchical hot line fairness tracking according to one or more embodiments. The requested vector and serviced vector are passed around the system 200 along with and at the same time as passing the data in a cache line, thereby eliminating the need for a large centralized physical space in the design. Each cache line has its own requested vector and serviced vector. In addition, the requested and serviced vectors are structured hierarchically, reducing the storage space required as compared to a centralized queue. The serviced vector is a vector that tracks requests to access the cache line that were observed and have been granted access to the cache line. The requested vector is a vector that tracks requests to access the cache line that were observed, but access has not been granted. The requested and serviced vectors work concurrently to form encoded states of where the hot cache line has been requested and where it has already been granted access. A requestor who re-requests the same cache line (has already been granted access to the hot cache line once before) cannot receive the line again if there are other requestors who want the cache line and have not been granted access yet.

As further details of the structure of the serviced and requested vectors illustrated in FIG. 4, each vector includes scopes, which can be defined to function as desired. In one or more embodiments, FIG. 4 illustrates an example in which the serviced and requested vectors each include three hierarchical scopes which are the chip scope, drawer scope, and system scope. In the hierarchy, the drawer scope is higher than the chip scope, and the system scope if higher than the drawer scope. Each vector is kept within the hardware controllers 350 instead of the directory 344, thereby minimizing the number of bits needed, because there are a smaller number of hardware controllers 350 compared to number of cache entries in the directory 344. Although the requested and serviced vectors are described as vectors, it should be appreciated that any structure could be utilized to maintain, store, and eventually pass/transfer the respective states having a respective state per requester.

Figure 5A:
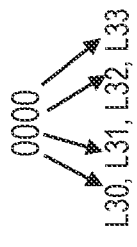
FIG. 5A illustrates an example chip scope for a hardware controller according to one or more embodiments of the present invention.

In FIG. 4, the chip scope which is the lowest scope tracks requests from other shared caches 206 (e.g., other L3 caches) on the same chip as the current shared cache 206 that has access to the cache line. Each shared cache 206 (e.g., L3 cache) on a chip 204 gets a unique bit corresponding to the particular shared cache 206 in the service and requested vectors. FIG. 5A illustrates an example chip scope for an example hardware controller 350 according to one or more embodiments. In FIG. 5A, the chip scope of the vector could be representative of a requested vector and/or a serviced vector. Because each processor chip (e.g., chip 0, chip 1, chip 2) has four shared caches (L30, L31, L32, L33), there are four bit places, one unique bit place (position) assigned to each shared cache 206 in the processor chip (such as, e.g., chip 0), as depicted in FIG. 5A. It is noted that the designation of bit places is from left to right in this example, but the designation could be from right to left, or some other designation. From left to right, the bit place/position in the chip scope corresponds to L30, L31, L32, L33 in an individual chip 204. Four bits are illustrated to represent the four example shared caches 206 in FIG. 2, but more or fewer chip scope bits can be utilized according to the number of shared caches 206 in an individual chip 204.

Figure 5B:
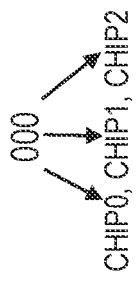
FIG. 5B illustrates an example drawer scope for a hardware controller according to one or more embodiments of the present invention.

In FIG. 4, the drawer scope tracks requests from other chips 204 that are on the same drawer 202 as the controlling hardware controller 350 of current shared cache 206 that has access to the cache line. Each chip 204 on a drawer 202 gets a unique bit corresponding to the particular chip 204 in the service and requested vectors. FIG. 5B illustrates an example drawer scope for an example hardware controller 350 according to one or more embodiments. In FIG. 5B, the drawer scope of the vector could be representative of a requested vector and/or a serviced vector. Because each drawer 202 (e.g., drawer 0, drawer 1, drawer 2) has three processor chips 204 (e.g., chip 0, chip 1, chip 2), there are three bit places, one unique bit place (position) assigned to each processor chip (e.g., chip 0, chip 1, chip 2) in a drawer 202 (such as, e.g., drawer 0), as depicted in FIG. 5B. From left to right, the bit place/position in the drawer scope corresponds to chip 0, chip 1, chip 2 in an individual drawer 202. Three bits are illustrated to represent the three example chips 204 in FIG. 2, but more or fewer drawer scope bits can be utilized according to the number of chips 204 in an individual drawer 202.

Figure 5C:
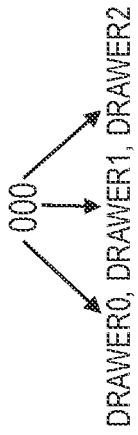
FIG. 5C illustrates an example system scope for a hardware controller according to one or more embodiments of the present invention.

In FIG. 4, the system scope tracks requests from other drawers 202. Each drawer 202 on the system 200 gets a unique bit corresponding to a particular drawer 202 in the service and requested vectors. FIG. 5C illustrates an example system scope for an example hardware controller 350 according to one or more embodiments. In FIG. 5C, the system scope of the vector could be representative of a requested vector and/or a serviced vector. Because the system 200 has three drawers 202 (e.g., drawer 0, drawer 1, drawer 2), there are three bit places, one unique bit place (position) assigned to each drawer 202 (e.g., drawer 0, drawer 1, drawer 2) in the system 200, as depicted in FIG. 5C. From left to right, the bit place/position in the system scope corresponds to drawer 0, drawer 1, drawer 2 in the system 200. Three bits are illustrated to represent the three example drawers 202 in FIG. 2, but more or fewer system scope bits can be utilized according to the number of drawers 202 in the system 200.

The hardware controllers 350 use an authority level for a cache line to set and reset tracking bits in the requested and serviced vectors for that cache line. Each cache line has its own associated requested vectors and serviced vectors. There are three types of authority levels discussed below, which include Global/System Coherency Authority, Drawer Coherency Authority, and Chip Coherency Authority. Global/System Coherency Authority (Global Intervention Master, or GIM) for a cache line is the highest point of coherency for that cache line if a GIM copy of the cache line exists in a shared cache 206. This authority is acquired by a hardware controller 350 by receiving a cache line and GIM authority for the cache line from the previous GIM (authority) for that cache line, and/or by determining that there are no other copies in the system 200 with GIM for the requested cache line in which case only the GIM then has authority to receive the cache line from memory. If an exclusive copy of the cache line exists in a shared cache, that cache line must also be the GIM. The GIM for a cache line is also the Drawer Intervention Master or DIM for its drawer and the Chip Intervention Master or CIM for its chip. In the 3-level intervention master hierarchy, only the GIM is allowed to return data for requests from other drawers, according to one or more embodiments. For a given cache line, there can only be one GIM in a system 200.

Next, turning to the Drawer Coherency Authority (Drawer Intervention Master, or DIM) for a cache line, the DIM is the highest level of authority for that cache line in a drawer 202.

This authority is acquired by a hardware controller 350 by receiving DIM authority for the cache line from the previous DIM on the drawer 202 for that cache line, and/or by determining that there are no other copies in the drawer 202 with DIM for the requested cache line in which case only the DIM then has authority to request the cache line from other drawers 202. A GIM copy of the cache line may be downgraded to DIM when a shared copy of the cache line and GIM authority are passed to another drawer 202. If a shared cache 206 controlled by a hardware controller 350 has a copy of the cache line with DIM authority but not GIM authority, the hardware controller 350 must have a read-only copy of the line. The DIM for a cache line is also the CIM for its chip 204. In the 3-level intervention master hierarchy, only the DIM is allowed to return data for requests from other chips on its drawer, according to one or more embodiments. For a given cache line, there can be as many DIMs in the system 200 as there are drawers 202, but only one per drawer.

Chip Coherency Authority (Chip Intervention Master, or CIM) for a cache line is the highest level of authority for that cache line in a chip. This authority is acquired by a hardware controller 350 by receiving CIM authority for the cache line from the previous CIM on the chip for that cache line, and/or by determining that there are no other copies on the chip with CIM for the requested cache line in which case only the CIM then has authority to request the cache line from other chips. A DIM copy of the line may be downgraded to CIM when a shared copy of the cache line and DIM authority are passed to another chip 204. If a cache has a copy of the cache line with CIM authority but not GIM authority, the controlling hardware controller 350 must have a read-only copy of the line. In the 3-level intervention master hierarchy, only the CIM is allowed to return data for requests from other shared caches 206 on its chip.

A non-intervention master copy of a cache line is a read-only copy of the cache line in a shared cache 206 (e.g., L3 cache) that does not have any authority to share the cache line with other requesters. This can sometimes be thought of as the lowest coherency scope.

Turning to further details regarding maintaining the requested and serviced vectors, an example is discussed for setting and resetting tracking bits in the requested and serviced vectors for a cache line. As noted herein, hardware controllers 350 are responsible for setting and maintaining the fairness vectors. Each hardware controller 350 updates both vectors (i.e., requested vector and serviced vector) based on the on-chip and off-chip requests that the particular hardware controller 350 observes, as well as based on the fairness the hardware controller 350 receives once it gets access to the cache line. For example, once a hardware controller 350 receives data that indicates there are unserviced requesters, the hardware controller 350 does not retire as usual after the hardware controller 350 returns data to the processor core. Instead, the hardware controller 350 remains active to protect the cache line until an eligible requestor arrives. While waiting for an eligible requestor to arrive, the hardware controller 350 ensures that requests (also referred to as snoops) from non-eligible requesters get a coherency reject.

To set a requested bit in a scope, a requestor must compare against a local hardware controller 350 of a local shared cache that has the authority level that can service both the requestor and the local shared cache 206 (e.g., L3 cache). The local hardware controller works for its shared cache and is the controlling hardware controller for a cache line of a given shared cache. The requestor requesting access to the cache line of the given shared cache is the requestor hardware controller of its shared cache. Because each shared cache has its own hardware controllers, sometimes a shared cache may be referred to as requesting a cache line. To set a bit in the requested vector for the chip scope, the local hardware controller 350 of the local shared cache 206 (e.g., shared cache L30) must have established itself as at least a chip coherency authority before hardware controller 350 can start tracking requests from other hardware controllers 350 corresponding to other shared caches 206 (e.g., other shared caches L31, L32, L33) on the processor chip 204 (such as, e.g., processor chip 0).

To set a bit in the requested vector for drawer scope, the local hardware controller 350 of the local shared cache 206 must have established itself as at least a drawer coherency authority before hardware controller 350 can start tracking requests from other chips 204 on the drawer 202 for the cache line of a given shared cache.

To set a bit in the requested vector for system scope, the local hardware controller 350 of the local shared cache 206 must have established itself as the system coherency authority before the hardware controller 350 can start tracking requests from other drawers 202 on the system 200 for the cache line of a given shared cache.

These setting restrictions are utilized because otherwise, an observed request could be served by someone else (e.g., another hardware controller 350 for another shared cached 206 that does have proper authority) and should not be counted as a request that must be serviced by the local hardware controller 350 for a shared cache 206.

Further details of maintaining the requested and serviced vectors are discussed below. For a serviced vector, serviced bits in a scope (e.g., such as chip, drawer, and system scopes) get set when a local hardware controller 350 for its corresponding shared cache 206 with access to the cache line data sets its own corresponding chip, drawer, and system bits. For a requested vector, requested bits in a scope (e.g., such as chip, drawer, and system scopes) get reset when the corresponding serviced bit of the serviced vector is set in the same scope, as well as when the local shared cache 206 via its hardware controller 350 invalidates its own copy, and/or a timeout limit has been reached. For a serviced vector, serviced bits in a scope (e.g., such as chip, drawer, and system scopes) get reset when all known requesters have been serviced, when the local shared cache 206 via its hardware controller 350 invalidates its copy, and/or when the timeout limit has been reached. Requested and serviced bits in a lower scope are reset when the cache line is passed to a requestor of a higher scope (i.e., drawer vector gets cleared if the cache line is passed to another drawer, but the drawer vector will keep its data if the cache line is passed to another chip on the same drawer). Moreover, the drawer scope/vector refers to the chips on this drawer, which is relative to the L3 cache maintaining the vector. If the cache line moves to another chip on this same drawer, the drawer vector values are still meaningful for the receiving chip since the drawer vectors of both the sending and receiving chip refer to chips on the same drawer. On the other hand, if the cache line moves to a chip on another drawer, then the new drawer scope/vector created on the receiving chip will refer to the receiving drawer, while the drawer scope/vector on the sending chip refers to chips on the sending drawer. The state in the drawer scope/vector from the sending drawer is meaningless to the receiving drawer, and therefore, requested and serviced bits in a lower scope are reset when the cache line is passed to a requestor of a higher scope.

Further details are discussed regarding passing the requested and serviced vectors around the system 200, thereby providing a decentralized hot cache line tracking fairness mechanism. The requested and serviced fairness vectors for each cache line are passed along (e.g., from one hardware controller 350 for a shared cache 206 to the next hardware controller 350 for a shared cache 206) as part of the metadata for that cache line. Only un-serviced requestors get access to the cache line next, based on checking serviced bits in the serviced vector. All serviced requestors are rejected and must come back to try again. The fairness vectors (i.e., the requested vector and serviced vector) will not be passed to a higher scope until there are no requested bits in the requested vector set for lower scopes. Serviced bits/states in the serviced vector are eventually reset based on the already established rules.

FIG. 6 depicts a block diagram illustrating an example of vector maintenance and passing for decentralized hot cache line tracking fairness according to one or more embodiments of the invention. This example scenario is vector updating and passing on chip, for example, passing the requested vector and serviced vector on the same chip 0. Accordingly, the example scenario illustrates chip scope and drawer scope but does not illustrate system scope, for ease of understanding. It should be appreciated that system scope applies by analogy.

At action 601, shared cache L30 (which is a shared cache 206) via its controlling hardware controller 350 has access to and/or control of the cache line of a given shared cache 206. For explanation purposes, the controlling hardware controller 350 is designation used to illustrate that the hardware controller has control of the cache line of the given shared cache. In this example, there are four shared caches 206 (e.g., L30, L31, L32, L33) depicted by four bits in the chip scope for both the requested vector and the serviced vector. Also, in this example, there are two chips 204 (e.g., chip 0, chip 1) depicted by two bits in the drawer scope. As can be seen at action 601, the hardware controller state for the requested vector is all zeros. In the requested vector, the four bits of the chip scope are all zeros because no other shared cache 206 on the same chip 204 (e.g., chip 0) has requested access to the cache line. Also, in the requested vector, the two bits of the drawer scope are all zeros because no other chip has requested access to the cache line.

However, in the chip scope of the serviced vector, the first bit (i.e., the most left bit) corresponding to shared cache L30 is set to one ("1") because the shared cache L30 is being serviced (i.e., accessing the cache line of the given shared cache) in action 601, which means the hardware controller 350 for the shared cache L30 is controlling accessing to the cache line. The remaining serviced bits in the chip scope of the serviced vector are zero because the other shared caches 206 on the same chip 204 (e.g., chip 0) have not previously been serviced, which means the other shared caches 206 (e.g., L31, L32, L33) have not had access to the cache line via their respective hardware controllers 350. In the drawer scope of the serviced vector, the first bit which is the most left bit is set to one ("1") because the corresponding chip 204 which is chip 0 is being serviced. The remaining serviced bit in the drawer scope of the serviced vector is set to zero because the other chip 204 (e.g., chip 1) on the same drawer 202 (e.g., drawer 0) has not been serviced. If there were more than one drawer in this example, then a system scope would have a bit set to identify the drawer currently being serviced, thereby identifying the drawer having a chip currently serviced. Since this example shows the first round, the other serviced bits are zero but if other caches had been serviced, then their respective bits would be one.

At action 602, shared cache L32 via its requestor hardware controller 350 requests the cache line (fetches) from the controlling hardware controller 350 of shared cache L30. At this point, the shared cache L32 is a requestor via its requestor hardware controller 350. The controlling hardware controller 350 of shared cache L30 records the request from shared cache L32 in the corresponding (L32) bit place in the chip scope of requested vector and rejects the request by the shared cache L32. As seen in the requested vector, the second from the right bit in the chip scope is now set to one ("1") which indicates the corresponding shared cache L32 at that bit position has requested the cache line of the given shared cache. Because the controlling hardware controller 350 of the shared cache L30 is still using the cache line, the controlling hardware controller 350 rejects the request by the shared cache L32.

At action 603, shared cache L33 via its requestor hardware controller 350 requests the cache line (fetches) from the controlling hardware controller 350 of shared cache L30. At this point, the shared cache L33 is another requestor via its requestor hardware controller 350. The controlling hardware controller 350 of shared cache L30 records the request from shared cache L33 in the corresponding (L33) bit place in the chip scope of the requested vector and rejects the request by the shared cache L33. As seen in the requested vector at action 603, the far right bit in the chip scope is now set to one ("1") which indicates the corresponding shared cache L33 at that bit position has requested the cache line of the given shared cache 206. Because the controlling hardware controller 350 of the shared cache L30 is still using the cache line, the controlling hardware controller 350 rejects the request by the shared cache L33.

At action 604, the shared cache L32 via its requestor hardware controller 350 requests the cache line again from the controlling hardware controller 350 of the shared cache L30. At action 605, the shared cache L30 via its controlling hardware controller 350 passes the cache line to the shared cache L32 via its hardware controller 350. In addition to passing access and/or control of the cache line, the controlling hardware controller 350 of shared cache line L30 also passing the requested vector and serviced vector for the cache line of the given shared cache 206 to the requestor hardware controller 350 of the shared cache L32. At this point the hardware controller 350 of shared cache L32 becomes the new controlling hardware controller 350. As the controlling (L32) hardware controller 350 of shared cache L32, the controlling (L32) hardware controller 350 updates the requested bit corresponding to shared cache L32 in the chip scope of the requested vector from one to zero because the shared cache L32 has access to the cache line and there is no longer an un-serviced request for the shared cache L32. Additionally, the controlling (L32) hardware controller 350 updates the serviced bit corresponding to the shared cache L32 in the chip scope of the serviced vector from zero to one because the shared cache L32 is being serviced, which means the shared cache L32 via its controlling (L32) hardware controller 350 has access/control of the cache line in the given shared cache.

FIGS. 7A and 7B depict a block diagram illustrating an example of vector maintenance and passing for decentralized hot cache line tracking fairness according to one or more embodiments of the invention. This example scenario is vector updating and passing off chip, for example, passing the requested vector and serviced vector from one chip 204 to another chip 204 such as from chip 0 to chip 1 in the same drawer 202. Accordingly, the example scenario illustrates chip scope and drawer scope but does not illustrate system scope, for ease of understanding. Although this example scenario is for chips in the same drawer, it should be appreciated that system scope applies by analogy for multiple drawers.

At action 701 (similar to action 601), shared cache L30 (which is a shared cache 206) via its controlling hardware controller 350 has access to and/or control of the cache line of a given shared cache 206. The controlling hardware controller 350 has control of the cache line of the given shared cache. In this example as noted above, there are four shared caches 206 (e.g., L30, L31, L32, L33) depicted by four bits in the chip scope for both the requested vector and the serviced vector. Also, in this example, there are two chips 204 (e.g., chip 0, chip 1) depicted by two bits in the drawer scope. As can be seen at action 701, the hardware controller state for the requested vector is all zeros. In the requested vector, the four requested bits of the chip scope are all zeros because no other shared cache 206 on the same chip 204 (e.g., chip 0) has requested access to the cache line. Also, in the requested vector, the two requested bits of the drawer scope are all zeros because no other chip has requested access to the cache line.

Similar to FIG. 6, in the chip scope of the serviced vector, the first serviced bit (i.e., the most left bit) corresponding to shared cache L30 is set to one ("1") because the shared cache L30 is being serviced (i.e., accessing the cache line of the given shared cache), which means the hardware controller 350 for the shared cache L30 is controlling access to the cache line of the given shared cache 206. The remaining serviced bits in the chip scope of the serviced vector are zero because the other shared caches 206 on the same chip 204 (e.g., chip 0) have not previously been serviced, which means the other shared caches 206 (e.g., L31, L32, L33) have not had access to the cache line via their respective hardware controllers 350. In the drawer scope of the serviced vector, the first serviced bit which is the most left bit is set to one ("1") because the corresponding chip 204 which is chip 0 is being serviced. The remaining serviced bit in the drawer scope of the serviced vector is set to zero because the other chip 204 (e.g., chip 1) on the same drawer 202 (e.g., drawer 0) has not been serviced. If there were more than one drawer in this example, then a system scope would have a bit set to identify the drawer currently being serviced, thereby identifying the drawer having a chip currently serviced. Since this example shows the first round, the other service bits are zero but if other caches had been serviced, then their respective serviced bits would be one.

In FIG. 7A, at action 702, shared cache L33 via its requestor hardware controller 350 on chip 0 requests the cache line (fetches) from the controlling hardware controller 350 of shared cache L30 on chip 0. At this point, the shared cache L33 is a requestor via its requestor hardware controller 350. The controlling hardware controller 350 of shared cache L30 records the request from shared cache L33 in the corresponding (L33) bit place in the chip scope of requested vector and rejects the request by the shared cache L33. As seen in the chip scope of the requested vector for action 702, the furthest right requested bit is now set to one ("1") which indicates the corresponding shared cache L33 at that bit position has requested the cache line of the given shared cache 206. Because the controlling hardware controller 350 of the shared cache L30 is using the cache line, the controlling hardware controller 350 rejects the request by the shared cache L33.

At action 703, chip 1, via a requestor hardware controller 350 for a shared cache 206 in chip 1, requests the cache line of the given shared cache from the controlling hardware controller 350 of the shared cache L30 on chip 0. At this point, chip 1 is another requestor via the requestor hardware controller 350 for a shared cache on chip 1 but is on a different chip 204. The controlling hardware controller 350 of shared cache L30 records the request from chip 1 in the corresponding (chip 1) requested bit place in the drawer scope of requested vector and rejects the request from chip 1 because a chip scope requested bit is set. Having the requested bit set (i.e., "1") in the chip scope of the requested vector indicates that there is another shared cache 206 (i.e., shared cache L33) on the same chip 204 (i.e., chip 0) as the controlling shared cache 206 (i.e., shared cache L30) that has requested the cache line and is to be given the cache line before a higher scope request. In the hierarchy, the chip scope is lower than drawer scope, and drawer scope is lower than system scope; accordingly, requestors are processed in the order from lowest scope to highest scope. As seen in action 703, the bit second from the left is now set to one ("1") which indicates the corresponding chip 1 (which is a chip 204) at that bit position has requested the cache line of the given shared cache 206. Because a requested bit is set in the chip scope of the requested vector and because the controlling hardware controller 350 of the shared cache L30 is still using the cache line, the controlling hardware controller 350 rejects the request by the chip 1.

At action 704, the shared cache L33 (on chip 0) via its requestor hardware controller 350 requests the cache line again from the controlling hardware controller 350 of the shared cache L30 (on the same chip 0 in the same drawer). At action 705, the shared cache L30 via its controlling hardware controller 350 passes the cache line to the shared cache L33 via its requestor hardware controller 350. In addition to passing access and/or control of the cache line, the controlling hardware controller 350 of shared cache line L30 also passes the requested vector and serviced vector for the cache line of the given shared cache 206 to the requestor hardware controller 350 of the shared cache L33. At this point the hardware controller 350 of shared cache L33 becomes the controlling hardware controller 350. As the controlling (L33) hardware controller 350 of shared cache L33, the controlling (L33) hardware controller 350 updates the requested bit corresponding to shared cache L33 (itself) in the chip scope of the requested vector from one to zero because the shared cache L33 now has access to the cache line and there is no longer an un-serviced request for the shared cache L33. Additionally, the controlling (L33) hardware controller 350 updates the serviced bit corresponding to the shared cache L33 in the chip scope of the serviced vector from zero to one because the shared cache L33 is serviced, which means the shared cache L33 via its controlling (L33) hardware controller 350 has access/control of the cache line in the given shared cache. Setting the serviced bit in the chip scope of the serviced vector for the shared cache L33 prevents the shared cache L33 from being able to receive access/control of the cache line again before another requestor waiting in line. For the shared cache L33, the requested bit and the serviced bit are each the far right bit in the respective chip scope in the requested vector and serviced vector.

At action 706, chip 1, via a requestor hardware controller 350 for a shared cache 206 in chip 1, again requests the cache line of the given shared cache from the controlling hardware controller 350 of the shared cache L33 on chip 0.

At action 707, the shared cache L33 via its controlling hardware controller 350 passes the cache line to chip 1 (via its requestor hardware controller 350) with zero chip scope bits/vectors in both the requested vector and the serviced vector. The previous chip scope bits (i.e., chip scope vectors) in the requested vector and the serviced vector were maintained for chip 0, but now, the chip scope of the requested vector and serviced vector are tracked for chip 1. As noted above, in addition to passing access and/or control of the cache line, the controlling hardware controller 350 of shared cache line L33 also passes the requested vector and serviced vector for the cache line of the given shared cache 206 to the requestor hardware controller 350 of chip 1. Chip 1 installs (i.e., saves) the cache line in shared cache L32 on chip 1. The requestor hardware controller 350 of shared cache L32 is now the controlling hardware controller 350 of the cache line (which is for a given shared cache 206). As the controlling (L32 on chip 1) hardware controller 350 of shared cache L32, the controlling (L32 on chip 1) hardware controller 350 updates the requested bit corresponding to chip 1 (itself) in the drawer scope of the requested vector from one to zero because the chip 1 has access to the cache line and there is no longer an un-serviced request from chip 1; for example, there could still be un-serviced requests from other hardware controllers 350 for their respective shared caches 206 on chip 1, but chip 1 now has drawer authority for the cache line, so it does not need to ask other chips for it. Additionally, the controlling (L32 on chip 1) hardware controller 350 updates the serviced bit corresponding to the shared cache L32 in the chip scope of the serviced vector from zero to one because the shared cache L32 on chip 1 is serviced, which means the shared cache L32 via its controlling (L32 on chip 1) hardware controller 350 has access to/control of the cache line in the given shared cache. Setting the serviced bit in the chip scope of the serviced vector for the shared cache L32 prevents the shared cache L32 from being able to receive access to and/or control of the cache line again before another requestor waiting in line. For the shared cache L32, the requested bit and the serviced bit are each the third from bit from the left in the respective chip scope in the requested vector and serviced vector. For chip 1, the requested bit and the serviced bit are each the second bit from the left.

Although the system scope is not shown in FIGS. 7A and 7B, if a request from different drawer 202 (e.g., drawer 2) were received, the following would need to be true in order to give the shared cache line to the other drawer 202: all lower scope requested vectors would need to be empty, meaning there would be requested bits set in neither the chip scope nor the drawer scope vectors.

FIG. 8 is a flowchart of a computer-implemented process 800 for a decentralized hot cache line tracking fairness mechanism for accessing a cache line in a shared cache according to one or more embodiments of the invention. The computer-implemented process 800 can be performed by hardware controllers 350 in respective shared caches 206 in any chip 204 which is in any drawer 202. Each shared cache 206 has its own hardware controllers 350 for accessing cache lines as understood by one of ordinary skill in the art. The hardware controllers 350 include logic 320 and memory 322, along with any other suitable circuitry, for operating in accordance with one or more embodiments of the invention. The memory 322 in each hardware controller 350 can be utilized to store the requested vector and serviced vector for a cache line in a given shared cache 206, and the requested vector and serviced vector are utilized to control access to the cache line in the given shared cache 206 according to one or more embodiments. For descriptive purposes and not limitation, a hardware controller that has access and/or control of the cache line is designated as a controlling hardware controller, while a hardware controller requesting access and/or control of the cache line is designated as a requestor hardware controller (i.e., requestor). The controlling hardware controller controls the cache line for its shared cache 206, while the requestor hardware controller is requesting control of the cache line for its shared cache 206, which can be on the same chip 204, on different chips 204 in the same drawer 202, and/or on different drawers 202 in system 200.

At block 802, a controlling hardware controller 350 having control of a cache line in a given shared cache 206 is configured to receive a remote snoop for the cache line from a requestor hardware controller 350 on behalf of second shared cache 206. The remote snoop is a fetch request for access to and/or control of the cache line of the first shared cache 206.

At block 804, the controlling hardware controller 350 is configured to check whether the controlling hardware controller 350 has the authority (level) to give the remote snoop the cache line. As noted above, the controlling hardware controller 350 may have the Global/System Coherency Authority, Drawer Coherency Authority, and/or Chip Coherency Authority. Global/System Coherency Authority is the Global Intervention Master (GIM). The GIM for a cache line is the Drawer Intervention Master (DIM) for its drawer and the Chip Intervention Master (CIM) for its chip. The Drawer Coherency Authority (Drawer Intervention Master) is the highest level of authority for that cache line in a drawer. Chip Coherency Authority (Chip Intervention Master) for a cache line is the highest level of authority for that cache line in a chip.

At block 806, when the controlling hardware controller 350 does not have authority to give the remote snoop the cache line of the given shared cache 206, the controlling hardware controller 350 does not grant the remote snoop and does not coherency reject the remote snoop. In other words, the controlling hardware controller 350 does not grant the fetch request, and therefore the requestor hardware controller 350 is not granted access to the cache line in the given shared cache 206. No changes are made to the requested vector and the serviced vector.

At block 808, when the controlling hardware controller 350 does have authority to give/grant the remote snoop for the cache line of the given shared cache 206 to the requestor hardware controller 350, the controlling hardware controller 350 is configured to check whether the remote snoop has already been serviced. For example, the controlling hardware controller 350 can check the chip scope, drawer scope, and system scope in the serviced vector in its memory 322 to determine whether the same requestor hardware controller 350 (e.g., representing a shared cache 206 on the same chip 204, another chip 204 in the same drawer 202, and/or another drawer 202 in the system 200, respectively) has previously been granted access to the cache line of the given shared cache 206 because of a previous fetch request. When the request from the requestor hardware controller 350 is for a shared cache 206 on chip, the controlling hardware controller 350 checks the corresponding bit place/position in the chip scope of the serviced vector to determine if the serviced bit is set (i.e., "1" which means previously granted access to the cache line) for the corresponding shared cache 206. When the request from the requestor hardware controller 350 is for another chip in the same drawer 202 (i.e., shared cache 206 off chip), the controlling hardware controller 350 checks the corresponding bit place/position in the drawer scope of the serviced vector to determine if the serviced bit is set (i.e., "1" which means previously granted access to the cache line) for the corresponding chip 204 (e.g., chip 0, chip 1, chip 2). When the request from the requestor hardware controller 350 is for another drawer 202 in system 200 (i.e., shared cache 206 in a different drawer 202 in system 200), the controlling hardware controller 350 checks the corresponding bit place/position in the system scope of the serviced vector to determine if the serviced bit is set (i.e., "1" which means previously granted access to the cache line) for the corresponding drawer 202 (e.g., drawer 0, drawer 1, drawer 2).

At block 810, if (YES) the requestor hardware controller 350 has already been granted access to the cache line of the given shared cache 206, the controlling hardware controller 350 rejects the remote snoop to try again later.

At block 812, if (NO) the requestor hardware controller 350 has not previously been granted access to the cache line of the given shared cache 206, the controlling hardware controller 350 is configured to check if its (controlling) shared cache 206 is in a state where it can process this remote snoop request. A few examples of reasons the (controlling) shared cache 206 could not process the request may include the following: it is out of resources required to process the request, it is not done installing the cache line, or it is in the process of transferring the cache line to another cache.

At block 814, if (YES) the (controlling) shared cache 206 for the controlling hardware controller 350 is in a state to process the remote snoop request, the controlling hardware controller 350 is configured to check if there is an un-serviced request of a lower scope in the requested vector than the current remote snoop request from the requestor hardware controller 350. As noted herein, there are three example scopes, which are chip scope (lowest scope) for shared caches 206 (e.g., L30, L31, L32, L33) on the same chip, drawer scope (next highest scope) for chips 204 (e.g., chip 0, chip 1, chip 2) in the same drawer 202, and system scope (highest scope) for drawers 202 (e.g., drawer 0, drawer 1, drawer 2) in the system 200. If no requested bit is set in the requested vector for a lower scope than the scope/level of the remote snoop request, then flow proceeds to block 816.

For example, if a requested bit is set in the chip scope (i.e., lowest scope) of the requested vector, then the current remote snoop request has to be for a shared cache 206 on chip in order to be granted access to the cache line, which means the current remote snoop has to be for another shared cache on the same chip as the (controlling) shared cache 206 of the controlling hardware controller 350.

If a requested bit is set in the drawer scope (i.e., next highest scope) of the requested vector, then the current remote snoop request has to be for a chip 204 in the same drawer 202 or for a shared cache 206 on chip 204 in order to be granted access to the cache line, which means the current remote snoop has to be for another chip 204 (having a shared cache) on the same drawer 202 as the (controlling) shared cache 206 of the controlling hardware controller 350 or the current remote snoop has to be for another shared cache on the same chip as the (controlling) shared cache 206 of the controlling hardware controller 350.

At block 816, the controlling hardware controller 350 is configured to grant the snoop request from the requestor hardware controller 350. Also, the controlling hardware controller 350 is configured to reset the lower scope vectors/bits in the requested vector and the serviced vector, transfer the requested vector and the serviced vector in memory 322 of the controlling hardware controller 350 to the requestor hardware controller 350, and retire the controller hardware controller 350 (itself). The lower scope vectors/bits are the requested bits and serviced bits that are lower that the level of the request made by the requestor. The levels of requests from lowest request to highest request can be for a lowest request on behalf of a shared cache on the same chip as the requestor hardware controller 350 of the (controlling) shared cache 206, a next highest request on behalf of a chip 204 in the same drawer 202, and a highest request on behalf of another drawer 202 in the system 200. Granting the request and transferring the requested vector and the serviced vector makes the requestor hardware controller 350 the new controlling hardware controller 350, which continues maintaining the requested and serviced vectors for the cache line of the give shared cache 206.

At block 818, if (NO) the shared cache 206 is not in a state to process the remote snoop request (block 812) or if (YES) there are still un-serviced lower scope requests in the requested vector (block 814), the controlling hardware controller 350 is configured to set the requested bit place/position in the requested vector for remote request. For example, the controlling hardware controller 350 is configured to set (i.e., "1") the requested bit place/position in the chip scope in the requested vector when the remote request is from a shared cache on chip, set the requested bit place/position in the drawer scope in the requested vector when the remote request is from another chip (i.e., off chip), and/or set the requested bit place/position in the system scope in the requested vector when the remote request is from another drawer. The flow from block 818 proceeds to block 810 discussed above.

In according with one or more embodiments, the hardware controller 350 can have a timeout mechanism to prevent fairness from slowing down forward progress of requestors gaining access to the cache line of a given shared cache. The timeout mechanism is implemented to help in the situation where a previously unsuccessful requestor takes too long to come back and request the cache line again. For example, the timeout counter, such as a counter 342, starts counting down when the local shared cache (L3 cache) that has access to the cache line indicates that it is in a state to process a snoop request and is keeping access to the cache line around with the sole purpose of handing off the fairness vectors to the next requestor. If the next requestor does not come to ask for the line before the timeout counter reaches 0, the fairness vectors (i.e., both the requested vector and serviced vector for that cache line) are cleared.

There are various technical solutions and benefits provided by using the decentralized hot cache line tracking fairness mechanism according to one or more embodiments. Techniques of ensuring cache line fairness include a requested and a serviced vector per active cache line, where a requested bit is set when a fetch (request) is rejected, where a serviced bit is set when the cache line is given to a new requestor, and/or where a fetch (request) from a requestor whose serviced bit is set is rejected. As technical solution and benefits of ensuring cache line fairness, the requested vector includes of requested bits representing requestors at a lower scope and requested bits representing groups of requestors at a higher scope, where higher scope requestors are rejected if there is a lower scope requestor with its requested bit set in the requested vector and its corresponding serviced bit not set in the serviced vector. A requested bit in the requested vector is only set once the requestor has become the intervention master at the scope of the incoming request. A hierarchy is provided where the scopes include a chip, a drawer, and a system scope. The requested vector and the serviced vector are maintained by a local fetch controller (i.e., the controlling hardware controller), where the local fetch controller is kept alive while there are requested bits in the requested vector and the corresponding bit is not set in the serviced vector and the local fetch controller is retired when a fetch (request) is serviced. A local fetch controller that is kept alive for the sole purpose of waiting to pass the vectors to the next requestor (i.e., the controller is in a state where it can process a request), can be retired after (1) the controller has passed the vectors along, or (2) the timeout limit has been reached. The values of the requested vector and serviced vector are sent as part of a data transfer for a fetch (request), where the lower scope bits in the requested and serviced vectors are cleared when the cache line is transferred to a higher scope.

Figure 9:
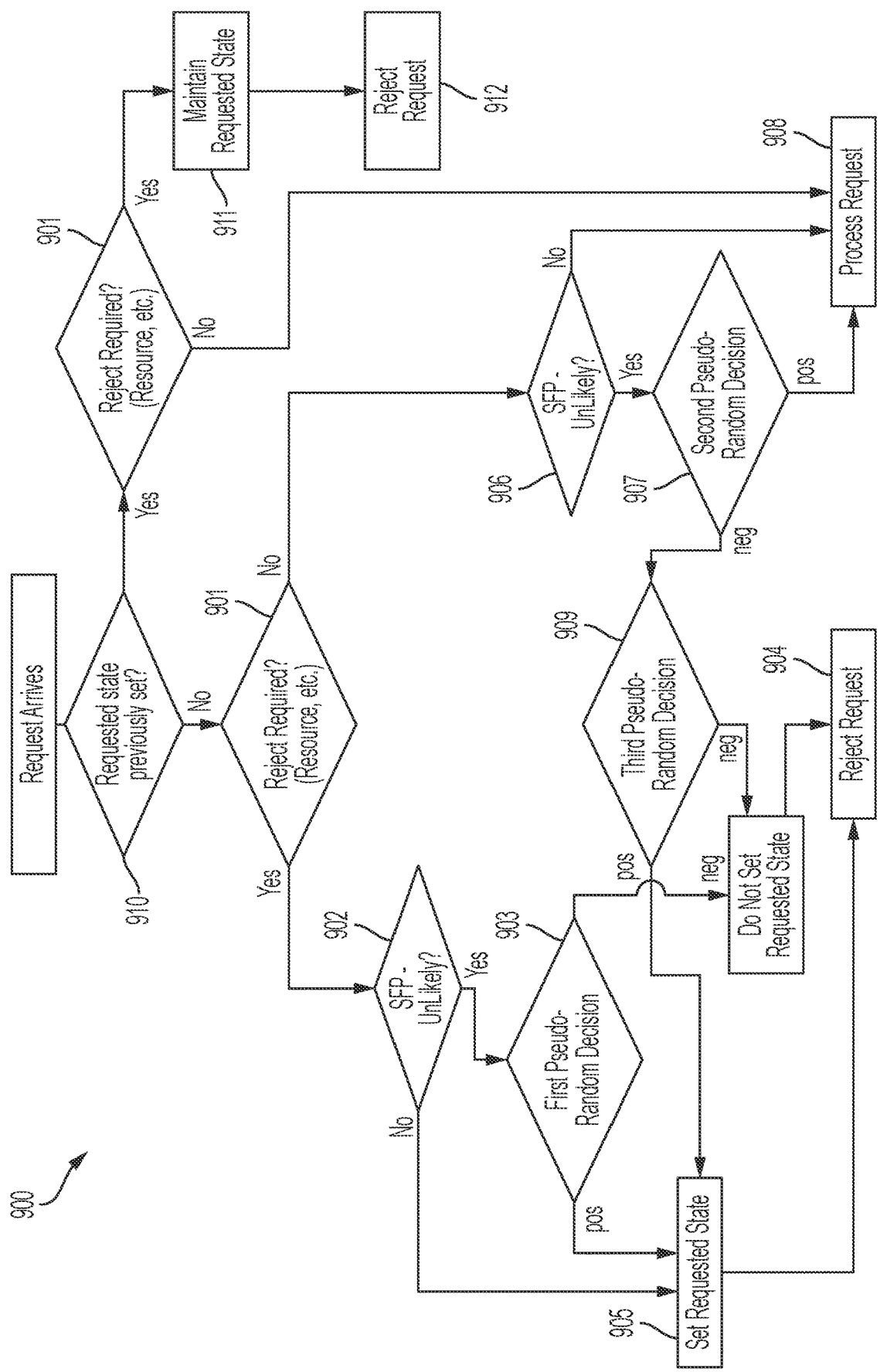
FIG. 9 is a flowchart of a computer-implemented method for executing a hot cache line fairness favoring software forward progress according to one or more embodiments of the present invention.

With reference to FIG. 9, a computer-implemented method 900 for handling a request or fetch (hereinafter referred to generally as a "request") is provided for when the request arrives at a hot line. The method 900 includes determining whether a rejection of the request is required 901 (see 812 and 814 of FIG. 8 and accompanying text) due to a lack of available resources, priority issues, etc., and determining whether the request is software forward progress (SFP)-likely or SFP-unlikely 902 upon determining that the rejection of the request is required is operation 901. The method 900 also includes executing a first pseudo random decision to set or not set a requested state of the request 903 in an event the request is determined to be SFP-likely or SFP-unlikely in operation 902, respectively, and rejecting the request 904 following execution of the second pseudo random decision of operation 903. The method 900 includes setting the requested state of the request 905 (see 818 in FIG. 8 and accompanying text) in an event the request is determined to be SFP-likely in operation 902 and subsequently rejecting the request 909.

As will be discussed below, a setting of the requested state of the request resulting from a positive result of the executing of operation 903 could, in some cases, substantially increase a likelihood that the request will be processed a next time the request arrives at the hot line.

The method 900 further includes determining whether the request is SFP-likely or SFP-unlikely 906 upon determining that the rejection of the request is not required in operation 901 and executing a second pseudo random decision to process the request or not to process the request 907 in an event the rejection of the request is determined to not be required in operation 901 and the request is determined to be SFP-unlikely in operation 906. Alternatively, the method 900 includes processing the request 908 in an event the rejection of the request is determined to not be required in operation 901 and the request is determined to be SFP-likely in operation 906. In an event a result of executing the second pseudo random decision in operation 907 is positive, the request is processed in operation 908. In an event the result of executing the second pseudo random decision in operation 907 is negative, the method 900 further includes executing a third pseudo random decision to set or not set the requested state of the request 909 and subsequently rejecting the request in operation 903.

In accordance with embodiments, the determining of whether the request is SFP-likely or SFP-unlikely of operations 902 and 906 include recognizing at least one of a hardware heuristic and an indicator of a software-controlled hint in the request or fetch. In addition, an execution of the first, second and third pseudo random decisions of operations 903, 907 and 909 can include establishing a configurable threshold value to arrive at desired rates of positive vs. negative decisions and comparing a value of a linear feedback shift register (LFSR) with the configurable threshold value. In any case, at least two or more of the first, second and third pseudo random decisions can be executed in a similar manner or in manners that differ from one another.

For example, for the first pseudo random decision of operation 903, the configurable threshold value can be set to arrive at 10% positive decisions. At this rate, one out of every ten SFP-unlikely requests will have their requested bits set so that they are processed upon next arrivals unless there are other reasons to reject per operation 901 as will be discussed below and the SFP-unlikely requests will not be starved completely. To continue the example, for the second and third pseudo random decisions of operations 907 and 909, the configurable threshold value can be set to arrive at 10% and at 2% positive decisions. At these rates, only one out of every ten SFP-unlikely requests will be processed in cases where request rejection is not required per operation 901 and only two out of the other nine SFP-unlikely requests will have their requested bit set in cases where request rejection is not required per operation 901.

In addition, the method 900 can include determining whether the requested state of the request is set or not set 910 prior to determining whether the rejection of the request is required in operation 901. If not, control proceeds as described above. If so, the method 900 includes maintaining the requested bit for the request 911 and subsequently rejecting the request 912 in an event the requested state is determined to be set in operation 910 and the rejection of the request is determined to be required in operation 901. Alternatively, in an event the requested state is determined to be set in operation 910 and the rejection of the request is determined to not be required in operation 901, the method can include processing the request per operation 908.

As such, since a request whose requested state is set on arrival at the hot line will be processed whether that request is SFP-likely or SFP-unlikely unless there is some external factor requiring that the request be rejected as determined in operation 901.

Figure 10:
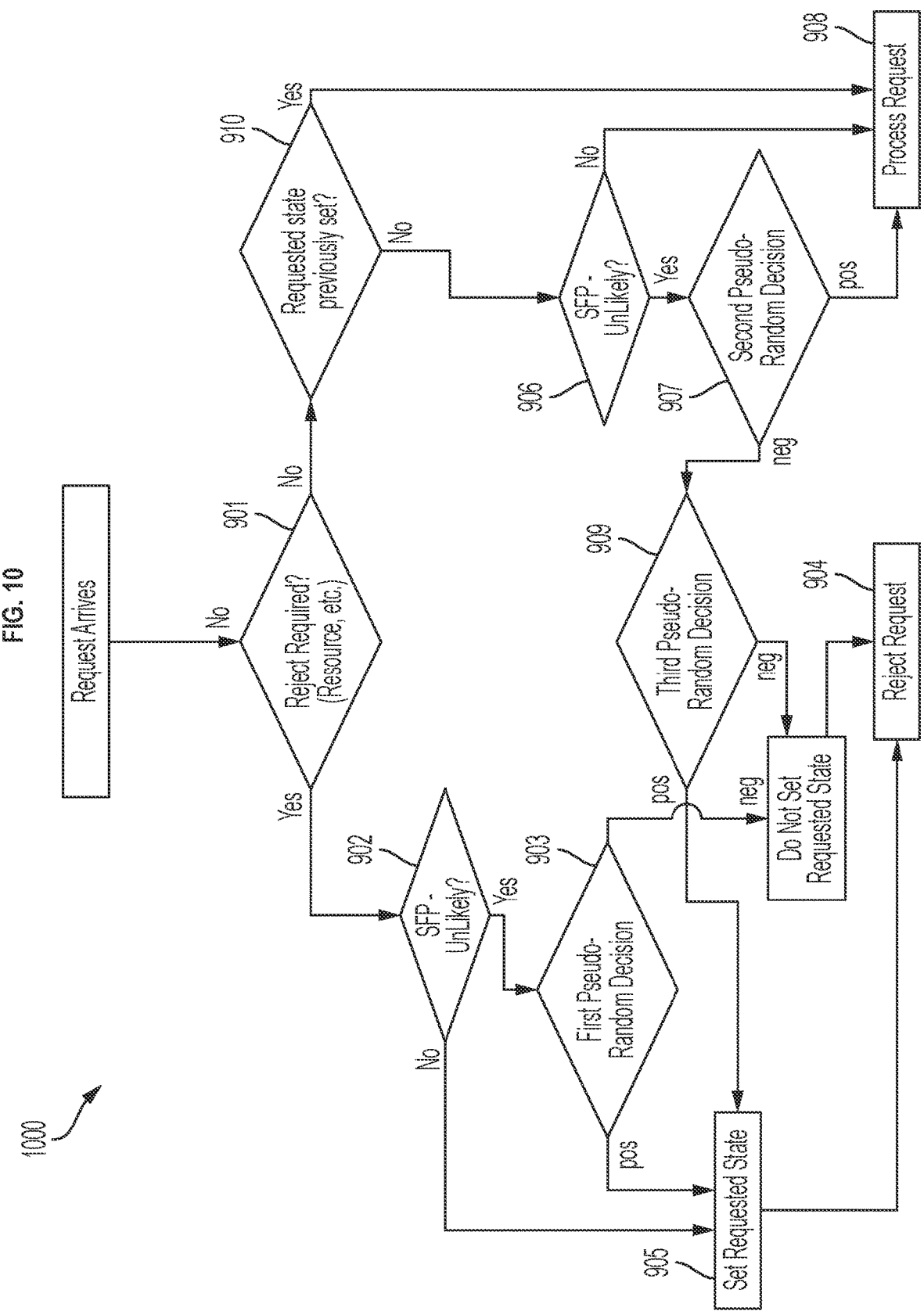
FIG. 10 is a flowchart of a computer-implemented method for executing a hot cache line fairness favoring software forward progress according to one or more embodiments of the present invention.

With reference to FIG. 10, a computer-implemented method 1000 for handling a request, such as a fetch, is provided for when the request or fetch arrives at a hot line. The method 1000 is generally similar to the method 900 except that the determining of whether the requested state of the request is set or not set (i.e., as a result of the execution of the first pseudo random decision of operation 903) of operation 910 is conducted after the determining of whether the rejection of the request is required of operation 901. In this case, in an event the requested state is determined to not be set as a result of operation 910, control proceeds to operation 906. Conversely, in an event the requested state is determined to be set as a result of operation 910, the request is processes per operation 908.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
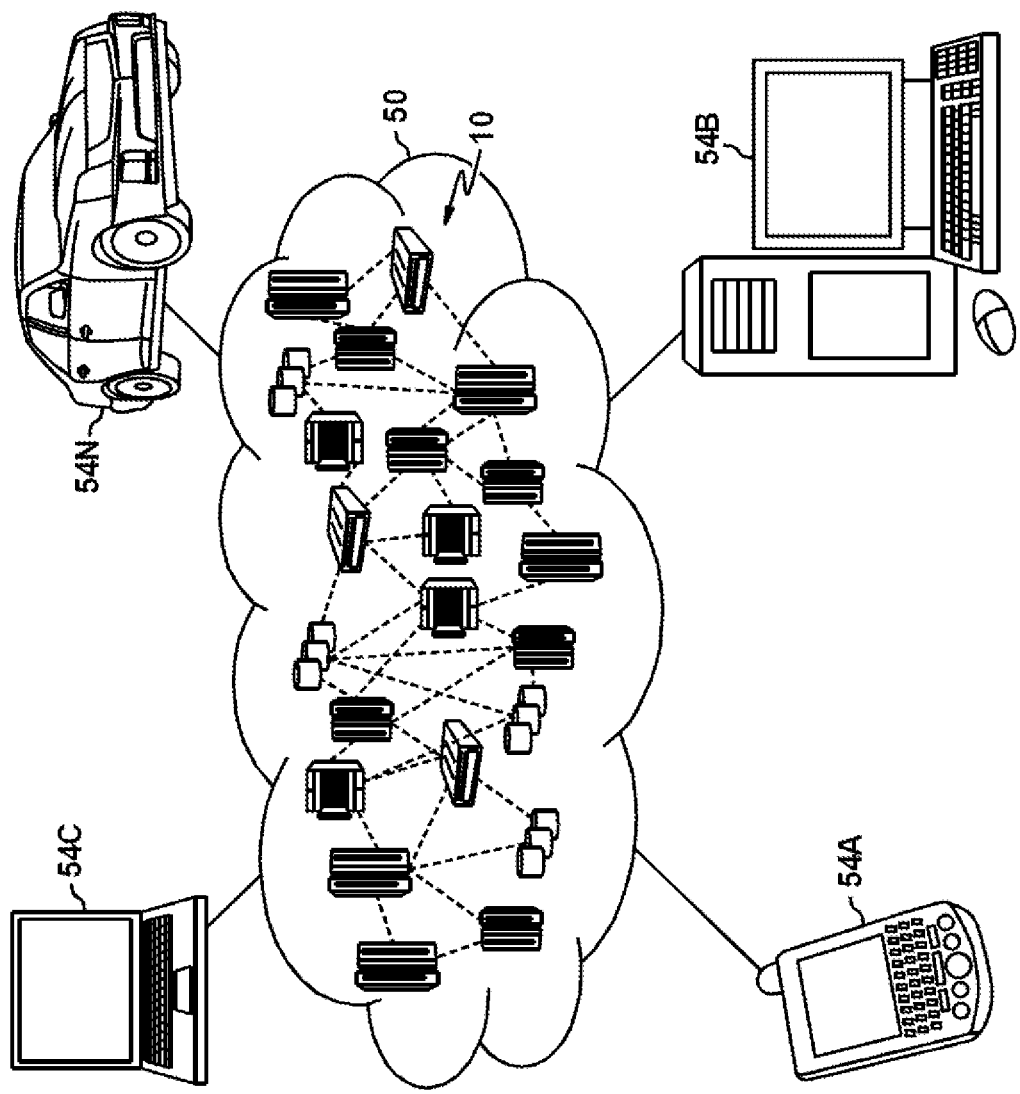
FIG. 11 depicts a cloud computing environment according to one or more embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
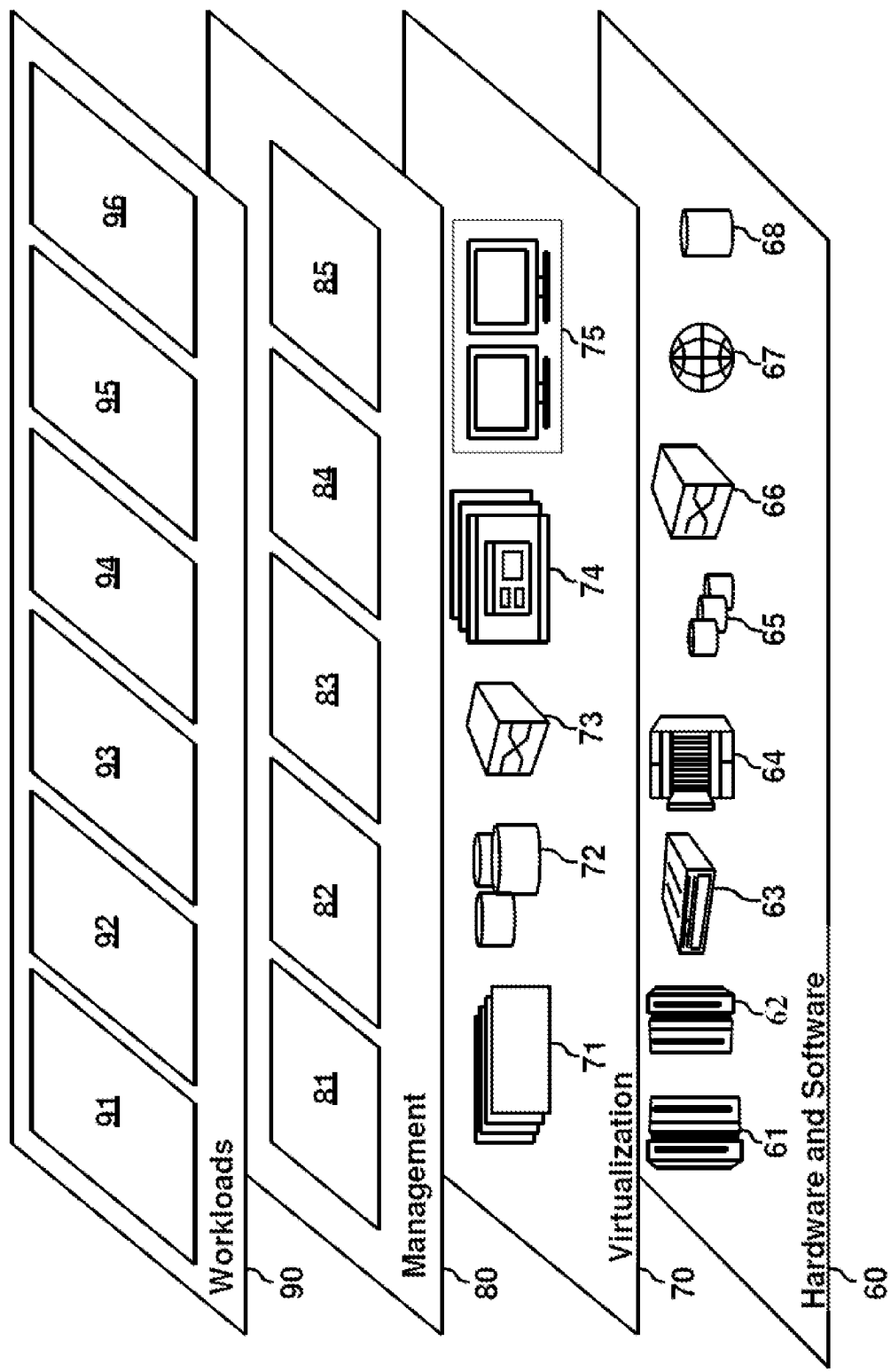
FIG. 12 depicts abstraction model layers according to one or more embodiments of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In one or more embodiments, the hardware components can include system 200 discussed herein including the hardware controller 350.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

FIG. 13 is a block diagram of a system 1300 according to embodiments of the invention. The system 1300 includes processing circuitry 1310 used to generate the design 1330 that is ultimately fabricated into an integrated circuit 1320 (e.g., chips 204), which use the decentralized hot cache line tracking fairness mechanism. The steps involved in the fabrication of the integrated circuit 1320 are well-known and briefly described herein. Once the physical layout 1340 is finalized, based, in part, on being configured to use the decentralized hot cache line tracking fairness mechanism according to embodiments of the invention, the finalized physical layout 1340 is provided to a foundry. Masks are generated for each layer of the integrated circuit based on the finalized physical layout. Then, the wafer is processed in the sequence of the mask order. The processing includes photolithography and etch. This is further discussed with reference to FIG. 14.

FIG. 14 is a process flow of a method of fabricating the integrated circuit according to exemplary embodiments of the invention. Once the physical design data is obtained, based, in part, on using the decentralized hot cache line tracking fairness mechanism in the chips 204, the integrated circuit 1320 can be fabricated according to known processes that are generally described with reference to FIG. 14. Generally, a wafer with multiple copies of the final design is fabricated and cut (i.e., diced) such that each die is one copy of the integrated circuit 1320. At block 1410, the processes include fabricating masks for lithography based on the finalized physical layout. At block 1420, fabricating the wafer includes using the masks to perform photolithography and etching. Once the wafer is diced, testing and sorting each die is performed, at block 1430, to filter out any faulty die.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The phrase "selective to," such as, for example, "a first element selective to a second element," means that the first element can be etched and the second element can act as an etch stop.

As used herein, "p-type" refers to the addition of impurities to an intrinsic semiconductor that creates deficiencies of valence electrons. In a silicon-containing substrate, examples of p-type dopants, i.e., impurities, include but are not limited to: boron, aluminum, gallium and indium.

As used herein, "n-type" refers to the addition of impurities that contributes free electrons to an intrinsic semiconductor. In a silicon containing substrate examples of n-type dopants, i.e., impurities, include but are not limited to antimony, arsenic and phosphorous.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device.

As noted above, atomic layer etching processes can be used in the present invention for via residue removal, such as can be caused by via misalignment. The atomic layer etch process provide precise etching of metals using a plasma-based approach or an electrochemical approach. The atomic layer etching processes are generally defined by two well-defined, sequential, self-limiting reaction steps that can be independently controlled. The process generally includes passivation followed selective removal of the passivation layer and can be used to remove thin metal layers on the order of nanometers. An exemplary plasma-based approach generally includes a two-step process that generally includes exposing a metal such a copper to chlorine and hydrogen plasmas at low temperature (below 20° C.). This process generates a volatile etch product that minimizes surface contamination. In another example, cyclic exposure to an oxidant and hexafluoroacetylacetone (Hhfac) at an elevated temperature such as at 275° C. can be used to selectively etch a metal such as copper. An exemplary electrochemical approach also can include two steps. A first step includes surface-limited sulfidization of the metal such as copper to form a metal sulfide, e.g., $Cu_2S$, followed by selective wet etching of the metal sulfide, e.g., etching of $Cu_2S$ in HCl. Atomic layer etching is relatively recent technology and optimization for a specific metal is well within the skill of those in the art. The reactions at the surface provide high selectivity and minimal or no attack of exposed dielectric surfaces.

Semiconductor lithography is the formation of three-dimensional relief images or patterns on the semiconductor substrate for subsequent transfer of the pattern to the substrate. In semiconductor lithography, the patterns are formed by a light sensitive polymer called a photoresist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The photoresist can be formed using conventional deposition techniques such chemical vapor deposition, plasma vapor deposition, sputtering, dip coating, spin-on coating, brushing, spraying and other like deposition techniques can be employed. Following formation of the photoresist, the photoresist is exposed to a desired pattern of radiation such as X-ray radiation, extreme ultraviolet (EUV) radiation, electron beam radiation or the like. Next, the exposed photoresist is developed utilizing a conventional resist development process.

After the development step, the etching step can be performed to transfer the pattern from the patterned photoresist into the interlayer dielectric. The etching step used in forming the at least one opening can include a dry etching process (including, for example, reactive ion etching, ion beam etching, plasma etching or laser ablation), a wet chemical etching process or any combination thereof.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method, comprising:
   determining whether a rejection of a request is required;
   determining whether the request is software forward progress (SFP)-likely or SFP-unlikely upon determining that the rejection of the request is required;
   executing a first pseudo random decision to set or not set a requested state of the request in an event the request is SFP-likely or SFP-unlikely, respectively; and
   rejecting the request following execution of the second first pseudo random decision.

2. The computer-implemented method according to claim 1, wherein the determining of whether the request is SFP-likely or SFP-unlikely comprises recognizing at least one of a hardware heuristic and an indicator of a software-controlled hint.

3. The computer-implemented method according to claim 1, further comprising:
   determining whether the request is SFP-likely or SFP-unlikely upon determining that the rejection of the request is not required;
   executing a second pseudo random decision to process the request or not to process the request in an event the rejection of the request is not required and the request is SFP-unlikely; and
   executing a third pseudo random decision to set or not set a requested state of the request in an event a result of executing the second pseudo random decision is negative; and
   rejecting the request following execution of the third pseudo random decision.

4. The computer-implemented method according to claim 3, wherein an execution of the first, second and third pseudo random decisions comprises:
   establishing a configurable threshold value to arrive at desired rates of positive versus negative decisions; and
   comparing a value of a linear feedback shift register (LFSR) with the configurable threshold value.

5. The computer-implemented method according to claim 3, wherein executions of at least two of the first, second and third pseudo random decisions are similar.

6. The computer-implemented method according to claim 3, wherein executions of at least two of the first, second and third pseudo random decisions differ.

7. The computer-implemented method according to claim 3, further comprising:
   determining whether the requested state of the request is set or not set prior to determining whether the rejection of the request is required;
   rejecting the request in an event the requested state is set and the rejection of the request is required; and
   processing the request in an event the requested state is set and the rejection of the request is not required.

8. A system comprising:
   a shared cache and a controller coupled to the shared cache, the controller configured to:
   determine whether a rejection of a request is required;
   determine whether the request is software forward progress (SFP)-likely or SFP-unlikely upon determining that the rejection of the request is required;
   execute a first pseudo random decision to set or not set a requested state of the request in an event the request is SFP-likely or SFP-unlikely, respectively; and
   reject the request following execution of the second first pseudo random decision.

9. The system according to claim 8, wherein the controller, in being configured to determine whether the request is SFP-likely or SFP-unlikely, the controller is further configured to recognize at least one of a hardware heuristic and an indicator of a software-controlled hint.

10. The system according to claim 8, wherein the controller is further configured to:
    determine whether the request is SFP-likely or SFP-unlikely upon determining that the rejection of the request is not required;
    execute a second pseudo random decision to process the request or not to process the request in an event the rejection of the request is not required and the request is SFP-unlikely;
    execute a third pseudo random decision to set or not set a requested state of the request in an event a result of executing the second pseudo random decision is negative; and
    reject the request following execution of the third pseudo random decision.

11. The system according to claim 10, wherein the controller, in being configured to execute the first, second and third pseudo random decisions, is further configured to:
    establish a configurable threshold value to arrive at desired rates of positive versus negative decisions; and
    compare a value of a linear feedback shift register (LFSR) with the configurable threshold value.

12. The system according to claim 10, wherein executions of at least two of the first, second and third pseudo random decisions by the controller are similar.

13. The system according to claim 10, wherein executions of at least two of the first, second and third pseudo random decisions by the controller differ.

14. The system according to claim 10, wherein the controller is further configured to:
    determine whether the requested state of the request is set or not set prior to determining whether the rejection of the request is required;
    reject the request in an event the requested state is set and the rejection of the request is required; and
    process the request in an event the requested state is set and the rejection of the request is not required.

15. A controller comprising logic, the logic executable to perform operations comprising:
    determining whether a rejection of a request is required;
    determining whether the request is software forward progress (SFP)-likely or SFP-unlikely upon determining that the rejection of the request is required;
    executing a first pseudo random decision to set or not set a requested state of the request in an event the request is SFP-likely or SFP-unlikely, respectively; and rejecting the request following execution of the second first pseudo random decision.

16. The controller according to claim 15, wherein the determining of whether the request is SFP-likely or SFP-unlikely comprises recognizing at least one of a hardware heuristic and an indicator of a software-controlled hint.

17. The controller according to claim 15, wherein the operations further comprise:
   determining whether the request is SFP-likely or SFP-unlikely upon determining that the rejection of the request is not required;
   executing a second pseudo random decision to process the request or not to process the request in an event the rejection of the request is not required and the request is SFP-unlikely; and
   executing a third pseudo random decision to set or not set a requested state of the request in an event a result of executing the second pseudo random decision is negative; and
   rejecting the request following execution of the third pseudo random decision.

18. The controller according to claim 17, wherein an execution of the first, second and third pseudo random decisions comprises:
   establishing a configurable threshold value to arrive at desired rates of positive vs. negative decisions; and
   comparing a value of a linear feedback shift register (LFSR) with the configurable threshold value.

19. The controller according to claim 17, wherein executions of at least two of the first, second and third pseudo random decisions are similar or different.

20. The controller according to claim 17, wherein the operations further comprise:
   determining whether the requested state of the request is set or not set prior to determining whether the rejection of the request is required;
   rejecting the request in an event the requested state is set and the rejection of the request is required; and
   processing the request in an event the requested state is set and the rejection of the request is not required.

* * * * *